US010125037B1

(12) United States Patent
Alcantar et al.

(10) Patent No.: US 10,125,037 B1
(45) **Date of Patent: *Nov. 13, 2018**

(54) COMPOSITION AND METHOD TO REDUCE SEDIMENT AND BACTERIAL CONTAMINATION FROM WATER

(71) Applicants: Norma A. Alcantar, Tampa, FL (US); Babu Joseph, Tampa, FL (US); Kevin A. Young, Tampa, FL (US); Audrey Lynn Buttice, Palmetto, FL (US)

(72) Inventors: Norma A. Alcantar, Tampa, FL (US); Babu Joseph, Tampa, FL (US); Kevin A. Young, Tampa, FL (US); Audrey Lynn Buttice, Palmetto, FL (US)

(73) Assignee: University of South Florida, Tampa, FL (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/947,557

(22) Filed: Nov. 20, 2015

Related U.S. Application Data

(63) Continuation-in-part of application No. 12/761,072, filed on Apr. 15, 2010, now abandoned.

(60) Provisional application No. 61/169,587, filed on Apr. 15, 2009.

(51) Int. Cl.
*C02F 1/00* (2006.01)
*C02F 1/52* (2006.01)

(52) U.S. Cl.
CPC .......... *C02F 1/5263* (2013.01); *C02F 1/5245* (2013.01); *C02F 2001/007* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 2,117,378 | A | 5/1938 | Tiffany |
| 2,845,363 | A | 7/1958 | Gutzeit |
| 4,769,155 | A | 8/1988 | Dwyer |

(Continued)

OTHER PUBLICATIONS

Chaudhuri and Sattar, Domestic Water Treatment for Developing Countries. In Drinking Water Microbiology, McFeters, G. A., Ed. Springer-Verlag NewYork Inc: New York City, 1990; pp. 168-184.

(Continued)

*Primary Examiner* — Krishnan S Menon
(74) *Attorney, Agent, or Firm* — Michele L. Lawson; Robert J. Varkonyi; Smith & Hopen, P.A.

(57) ABSTRACT

In recent years, a great deal of attention has been drawn to the issue of water contamination, particularly in developing countries, where an inexpensive, effective method of reducing waterborne pathogens and contaminants is needed. Experiments performed with mucilage extracted from the *Opuntia ficus-indica* cactus show that this mucilage is an effective tool for clearing contaminants from water supplies, including the removal of *Escherichia coli* and *Bacillus cereus* bacteria, and the reduction of arsenic concentrations with very low mucilage concentrations (5 mg/L and 10 mg/L). Results for *Bacillus* and *E. coli* show settling to be complete in approximately five to ten minutes with removal rates of up to 97%, when $CaCl_2$ is co-applied. Arsenic is removed at between 35% to 85% by increasing the contact time between the mucilage and the arsenic solutions depending on the pH and mucilage concentration.

4 Claims, 25 Drawing Sheets

(56) References Cited

U.S. PATENT DOCUMENTS

| | | | |
|---|---|---|---|
| 5,853,576 | A | 12/1998 | Kapulnik et al. |
| 5,876,484 | A | 3/1999 | Raskin et al. |
| 6,027,649 | A | 2/2000 | Benedek et al. |
| 6,576,816 | B2 | 6/2003 | Terry et al. |
| 6,974,896 | B1 | 12/2005 | Terry et al. |
| 7,014,776 | B1 | 3/2006 | DeBusk |
| 7,160,470 | B2 | 1/2007 | Davis et al. |
| 7,455,863 | B2 | 11/2008 | Hamann |
| 7,943,049 | B1 | 5/2011 | Alcantar et al. |
| 2004/0197812 | A1 | 10/2004 | Ma et al. |
| 2005/0198707 | A1 | 9/2005 | Meagher et al. |

OTHER PUBLICATIONS

Goycoolea and Cardenas, Pectins from *Opuntia* spp.: A short review. Journal of the Professional Association for Cactus Development 2003, 5, 17-29.

Larsen, et al., The effect of calcium ions on adhesion and competitive exclusion of *Lactobacillus* ssp and *E-coli* O138. International Journal of Food Microbiology 2007, 114, 113-119.

Medina-Torres, et al., Rheological properties of the mucilage gum (*Opuntia ficus indica*). Food Hydrocolloids 2000, 14, 417-424.

Miller, et al., Toward Understanding the Efficacy and Mechanism of *Opuntia* spp. as a Natural Coagulant for Potential Application in Water Treatment. Environmental Science and Technology 2008, 42, 4274-4279.

Trachtenberg and Mayer, Composition and Properties of Opuntia-Ficus-Indica Mucilage. Phytochemistry 1981, 20, 2665-2668.

Young, K. The Mucilage of Opuntia ficus indica: a natural, sustainable and viable water treatment technology for use in rural Mexico for reduction turbidity and arsenic contamination in drinking water. Master's Thesis, University of South Florida, Tampa, 2006.

Young, et al. Using the Mexican Cactus as a New Environmentally Benign Material for the Removal of Contaminants in Drinking Water. Materials Research Society 2005, 930, 965-966.

Young, et al., Cactus goo purifies water. Science News 2005.

Zita and Hermansson, Effects of Ionic-Strength on Bacterial Adhesion and Stability of Flocs in a Waste-Water Activated-Sludge System. Applied and Environmental Microbiology 1994, 60, 3041-3048.

Curtis et al. 2000. "Review: Domestic Hygiene and Diarrhoea—Pinpointing the Problem." Tropical Medicine and International Health. vol. 5. No. 1. pp. 22-32.

Davis et al. 2004. :Cadmium Biosorption by S. fluitans: Treatment, Resilience and Uptake Relative to Other *Sargassum* spp. and Brown Algae. Water Qual. Res. J. Canada. vol. 39. No. 3. pp. 183-189.

Garg et al. 1990. "Toxicity and Accumulation of Chromium in *Ceratophyllum demersum* L." Bull. Environ. Contam. Toxicol. vol. 44. No. 3. pp. 473-478. (Abstract).

Griffith. 2004. "The Origins of an Important Cactus Crop, *Opuntia ficus-indica* (Cactaceae): New Molecular Evidence." American Journal of Botany. vol. 91. No. 11. pp. 1915-1921.

Hrudey et al. 2007. "Published Case Studies of Waterbone Disease Outbreaks—Evidence of a Recurrent Threat." Water Environ. Res. vol. 79. pp. 233-245.

United Nations Development Programme (UNDP). 2003. "Human Development Report 2003. Millennium Development Goals: A Compact Among Nations to End Human Poverty." Oxford University Press. pp. x, 17, 35, 61, 89-91, 103-107, 123-125, 136-143.

United Nations Development Programme (UNDP). 2006. "Human Development Report 2006. Beyond Scarcity: Power, Poverty and the Global Water Crisis." Oxford University Press. pp. x-442.

Mintz et al. 2001. "Not Just a Drop in the Bucket: Expanding Access to Point-of-Use Water Treatment Systems." American Journal of Public Health. vol. 91. No. 10. pp. 1565-1570.

Lim. 1998. "Microbiology. Second Edition." WCB McGraw-Hill. pp. 130-170.

Misbahuddin et al. 2002. "Water Hyacinth Removes Arsenic From Arsenic-Contaminated Drinking Water." Environmental Health. vol. 57. Issue 6. pp. 516. (Abstract).

Quick et al. 1999. "Diarrhoea Prevention in Bolivia Through Point-of-Use Water Treatment and Safe Storage: A Promising New Strategy." Epidemiol. Infect. vol. 122. pp. 83-90.

Robinson et al. 2003. "The Uptake of Arsenic by New Zealand Watercress (*Lepidium sativum*)." The Science of the Total Environment. vol. 301. pp. 67-73.

Sanin et al. 2000. "Bioflocculation of Activated Sludge: The Role of Calcium Ions and Extracellular Polymers." Environmental Technology. vol. 21. pp. 1405-1412.

Sen et al. 1990. "Removal and Uptake of Copper (II) by Salvania natans from Waste Water." Water, Air and Soil Pollution. vol. 49. No. 1/2. pp. 1-6. (Abstract).

United Nations. 2007. "The Millennium Development Goals Report 2007." New York. pp. 23-26.

Tu et al. 2004. "Phytoremediation of Arsenic-Contaminatied Groundwater by the Arsenic Hyperaccumulating Fern *Pteris vittata* L." International Journal of Phytoremediation. vol. 6. No. 1. pp. 35-47.

Unger et al. 2008. "Assessing *Escherichia coli* Removal in the Schmutzdecke of Slow-Rate Biofilters." American Water Works Association Journal. vol. 100. No. 12. pp. 60-74.

Zhang et al. 2002. "Arsenic Speciation and Distribution in an Arsenic Hyperaccumulating Plant." The Science of the Total Environment. vol. 300. pp. 167-177.

Zimmels et al. 2004. "Use of Naturally Growing Aquatic Plants for Wastewater Purification." Water Environ. Res. vol. 76. No. 3. pp. 220-230.

U.S. Environmental Protection Agency. 2003. "Bacterial Water Quality Standards for Recreational Waters (Freshwater and Marine Waters) Status Report" Jun. 2003. EPA-823-R-03-008. pp. 1-4.

Cunningham. 2005. "Cactus Goo Purifies Water." Science News. vol. 168. No. 12. p. 190.

Smith, et al. Methods for preparing synthetic freshwaters. Water Research 36 (2002) 1286-1296.

Bacterial Water Quality Standards for Recreational Waters (Freshwater and Marine Waters Status Report), U.S. Environmental Protection Agency, Jun. 2003, pp. 1-4.

The Millennium Development Goals Report 2007, United Nations, New York, pp. 23-26.

Non-Final Office Action issued by the U.S. Patent and Trademark Office dated Aug. 9, 2011 for corresponding U.S. Appl. No. 12/761,072.

Final Office Action issued by the U.S. Patent and Trademark Office dated Jan. 27, 2012 for corresponding U.S. Appl. No. 12/761,072.

Non-Final Office Action issued by the U.S. Patent and Trademark Office dated May 20, 2015 for corresponding U.S. Appl. No. 12/761,072.

Non-Final Office Action issued by the U.S. Patent and Trademark Office dated Apr. 15, 2014 for corresponding U.S. Appl. No. 12/761,072.

Final Office Action issued by the U.S. Patent and Trademark Office dated Oct. 29, 2014 for corresponding U.S. Appl. No. 12/761,072.

Guidelines for Drinking-water Quality, World Health Organization, Geneva, 2008, Third Edition Incorporating the First and Second Addenda, vol. 1 Recommendations.

Non-Final Office Action issued by the U.S. Patent and Trademark Office dated Apr. 21, 2010 for corresponding U.S. Appl. No. 11/934,932.

Non-Final Office Action issued by the U.S. Patent and Trademark Office dated Oct. 20, 2010 for corresponding U.S. Appl. No. 11/934,932.

COMPOSITION AND METHOD TO REDUCE SEDIMENT AND BACTERIAL CONTAMINATION FROM WATER

CROSS REFERENCE TO RELATED APPLICATIONS

This application claims priority to U.S. Nonprovisional patent application Ser. No. 12/761,072, entitled "Composition and Method to Reduce Sediment and Bacterial Contamination from Water", filed on Apr. 15, 2010, which claims priority to U.S. Provisional Patent Application No. 61/169,587, entitled "Reducing Sediment and Bacterial Contamination from Water Using Cactus Mucilage", filed on Apr. 15, 2009, the contents of which are herein incorporated by reference.

GOVERNMENT SUPPORT STATEMENT

This invention was made with government support under grant numbers 0442977-DMI and 0854306, awarded by the National Science Foundation. The government has certain rights in the invention.

FIELD OF INVENTION

This invention relates to field water purification. Specifically, the invention is a composition and method for water purification using plant mucilage in conjunction with calcium chloride.

BACKGROUND OF THE INVENTION

Over the past few decades an increasing amount of awareness has been drawn toward water contamination problems worldwide. Although water is a renewable resource, it is difficult to obtain. For instance, in 2008 it was estimated that of the 70 percent of the Earth's surface that is water, only one percent of is viable freshwater for drinking (Thornton, *Water Loss Control Manual*. McGraw-Hill Professional: 2002). While developed countries obtain technological advancements with more efficient, effective methods of cleaning water, less developed countries lack the money, technical equipment and education to build and sustain the same structures and continue to struggle with contaminated water supplies (Bartram, J.; Howard, G., Drinking-water Standards for the Developing World. In *The Handbook of Water and Wastewater Microbiology*, Mara, D.; Horan, N., Eds. Academic Press: San Diego, Calif., 2003). In these countries the quality of health is severely hindered by contaminated wells, unforgiving storage methods and a lack of proper sanitation (Gleeson, and Gray, *The Coliform Index and Waterborne Disease: Problems of Microbial Drinking Water Assessment*. E & FN Spon: Boundary Row, London, 1997).

The United Nations has estimated that 1.1 billion people lack access to potable water and approximately 2.6 billion people have not been educated about, nor have developed, safe sanitation techniques (UN *Human Development Report* 2006*; Beyond scarcity: power, poverty and the global water crisis*; United Nations Development Programme: New York, N.Y., 2006; UN *Human Development Report* 2003*; Millennium Development Goals: A compact among nations to end human poverty*; United Nations Development Programme: New York, N.Y., 2003). With so many people living on the brink of illness and even death, a great deal of attention has been drawn to designing and implementing new and innovative methods of water purification, particularly in developing countries where the water crisis has hit the hardest. Gradually, the goal of bringing safe water to the world has developed into a series of goals from educating to finding a method of purification and distribution that will be both culturally accepted as well as sustainable (UN Human Development Report 2003; Millennium Development Goals: A compact among nations to end human poverty; United Nations Development Programme: New York, N.Y., 2003; UN The Millennium Development Goals Report 2007; United Nations: New York, N.Y., 2007).

Due to the common direct use of both ground water and runoff water, a lack of proper sanitation and poor water storage units, a wide variety of contaminants have access to the community water supplies. These contaminants include microorganisms, sediments, chemicals and heavy metals (EPA *Bacterial Water Quality Standards for Recreational Waters*; Office of Water: Washington D.C., 2003). These materials are likely to be found in the same water supply demonstrating that the method of purification that is used needs to be capable of treating a combination of contaminants.

Aside from sediment intrusion, another common problem associated with drinking water has been bacterial contamination. Even in more developed countries where purification and distribution systems are technologically advanced and water is closely monitored, cases of waterborne illnesses caused by bacteria are occasionally observed (Hrudey, and Hrudey, Published case studies of waterborne disease outbreaks—Evidence of a recurrent threat. *Water Environment Research* 2007, 79, 233-245). In developing countries, issues with bacterial contamination are more severe. The UN estimated in 2006 that an average of 1.8 million children die every year from diseases related to bacterial contamination which often cause severe diarrhea. Due to a lack of proper sanitation, bacteria can easily contaminate water supplies, either through supplying aquifers, water storage units, or by being exposed to ambient conditions once it has reached the house, although the water may have been previously subjected to decontamination. Water is used in the household for activities ranging from bathing to growing crops, which give bacteria that have infiltrated the water supply direct access to the families that obtain water from nearby lakes, rivers or the community well (Bitton, *Wastewater Microbiology.* 3 ed.; John Wiley & Sons, Inc: Hoboken, N.J., 2005).

*Escherichia coli* (*E. coli*) and Enterococci, both found in the large intestine of mammals, were introduced as indicator organisms to develop standards and indicate whether or not the water had been polluted with fecal contaminants (Bitton, *Wastewater Microbiology.* 3 ed.; John Wiley & Sons, Inc: Hoboken, N.J., 2005). In the United States standards for bacterial levels were set at 126 cells/100 mL for *E. coli* and 33 cells/100 mL for Enterococci under the Safe Drinking Water Act (SDWA) and the Clean Water Act (CWA). Methods of removing contaminants include filtration, disinfection, coagulation/flocculation and combinations of these three methodologies (Chaudhuri, and Sattar, Domestic Water Treatment for Developing Countries. In *Drinking Water Microbiology*, McFeters, G. A., Ed. Springer-Verlag NewYork Inc: New York City, 1990; pp 168-184). However, current technologies for removing contaminants are complex and expensive, limiting the use of these technologies in developing countries.

Coagulation and flocculation of bacterial flocs is based on the DLVO theory of colloidal suspensions. The DLVO theory, named after the developers Boris Derjaguin, Lev Landau, Evert Verwey, and Theodor Overbeek presupposes colloidal particles, such as flocs, have a core with a charge enveloped by a double layer with an opposing charge to the core. The particles act to attract one another via van der Waals forces and repulse one another via electrostatic repulsion based on the equation $$\beta U(r) = Z^2\lambda_B\left(\frac{\exp(\kappa a)}{1+\kappa a}\right)^2\frac{\exp(-\kappa r)}{r}. \quad \text{(Eq. 1)}$$

Where $\lambda_B$ is the Bjerrum length, $\kappa^{-1}$ is the Debye-Hückel screening length and $\beta^{-1}$ is the temperature in Kelvin. Altering the charges on the double layer, or compressing the double layer can have effects on the van der Waals and electrostatic interactions between particles, resulting in flocculation.

However, due to the high complexity and costs associated with current technologies, a simpler, more cost conscious method of removing contaminants is needed to permit individuals living in developing countries to obtain safe, potable water.

SUMMARY OF THE INVENTION

In an attempt to circumvent the problems associated with implementing purification methods based solely on technology, the use of a cactus indigenous to Mexico, the *Opuntia ficus-indica* (also known as the Nopal or Prickly Pear), is was tested as a flocculating agent for waterborne contaminant removal.

*O. ficus-indica*, is a cactus that is found in most areas of the globe that offer dry arid climates. Although native to Mexico, the *O. ficus-indica* has spread throughout the world and can currently be found growing in many regions including South America, North America, India, Africa and many of the countries surrounding the Mediterranean Sea (Russell, C. E.; Felker, P., The Prickly-Pears (*Opuntia* spp., Cactaceae): A Source of Human and Animal Food in Semiarid Regions. *Economic Botany* 1987, 41, (3), 433-445). Further, *O. ficus-indica* grows at an extremely fast rate, with reports that the fruit from the cactus could be harvested in as little as two to three months after the cactus is planted. In addition, vegetation production (dry weight) from the plant may be as much as 20,000-50,000 kg/ha/yr (1 ha=1 hectare=10,000 $m^2$) and fruit production of 8,000-12,000 kg/ha/yr (Russell, C. E.; Felker, P., The Prickly-Pears (*Opuntia* spp., Cactaceae): A Source of Human and Animal Food in Semiarid Regions. *Economic Botany* 1987, 41, (3), 433-445).

*Bacillus cereus*, a gram-positive, spore-forming, non-pathogenic soil dwelling rod (approximately 1 by 3 μm), and *Escherichia coli* (HB101), a gram-negative bacterium were used as a representative for bacterial contamination (Hardwood, C., *Bacillus*. Plenum Press: New York, 1989). As mucilage-aided flocculation result of surface interactions, *B. cereus* ad *E. coli* are useful surrogates for other bacteria of similar size that may also be found in contaminated water, as seen by the list of bacterial characteristics seen in Table 1. Recent studies have suggested that diatomic ions promote cell aggregation (Larsen, et al., The effect of calcium ions on adhesion and competitive exclusion of *Lactobacillus* ssp and *E-coli* O138. *International Journal of Food Microbiology* 2007, 114, 113-119; Zita and Hermansson, Effects Of Ionic-Strength On Bacterial Adhesion And Stability Of Flocs In A Waste-Water Activated-Sludge System. *Applied and Environmental Microbiology* 1994, 60, 3041-3048). Calcium chloride ($CaCl_2$) solutions were evaluated alone and in conjunction with mucilage treatments to determine removal efficiency.

TABLE 1

Characteristics of *Bacillus cereus* and *Escherichia coli* HB101.

| | *Bacillus cereus* | *Escherichia coli* |
|---|---|---|
| Type | gram-positive | gram-negative |
| Size, Shape | 1 × 3 μm, Rod | 1 × 2 μm, Rod |
| Location | Soil | Mammal Feces |
| Spore-forming | YES | NO |
| Optimal Growth | Temperature: 35-37° C. | Temperature: 35° C. |
| Conditions | Stirring: 200 rpm | Stirring: 200 rpm |
| Pathogenicity | None reported | None reported |

Through simple extraction processes, two fractions of mucilage gum can be obtained from fresh cut *Opuntia ficus-indica* cactus pads including a Gelling Extract (GE) and Non-Gelling Extract (NE) (Goycoolea, and Cardenas, Pectins from *Opuntia* spp.: A short review. *Journal of the Professional Association for Cactus Development* 2003, 5, 17-29; Young, K. The Mucilage of *Opuntia ficus indica*: a natural, sustainable and viable water treatment technology for use in rural Mexico for reduction turbidity and arsenic contamination in drinking water. Master's Thesis, University of South Florida, Tampa, 2006). Mucilage is thought to consist of up to 55 sugars, mainly arabinose, galactose, rhamnose, xylose, glucose and uronic acids, the percentage of which varies with mucilage type (Goycoolea, F. and Cardenas, Pectins from *Opuntia* spp.: A short review. *Journal of the Professional Association for Cactus Development* 2003, 5, 17-29; Trachtenberg, and Mayer, Composition And Properties Of *Opuntia-Ficus-Indica* Mucilage. *Phytochemistry* 1981, 20, 2665-2668; Medina-Torres, et al., Rheological properties of the mucilage gum (*Opuntia ficus indica*). *Food Hydrocolloids* 2000, 14, 417-424). Literature has previously indicated that these extracts, particularly the GE, undergo several property alterations including viscosity changes in the presence of diatomic ions such as $Ca^{2+}$ (Goycoolea, and Cardenas, Pectins from *Opuntia* spp.: A short review. *Journal of the Professional Association for Cactus Development* 2003, 5, 17-29; Medina-Torres, et al., Rheological properties of the mucilage gum (*Opuntia ficus indica*). *Food Hydrocolloids* 2000, 14, 417-424).

Young et al. demonstrated that cactus mucilage is an effective tool for separating sediments (clay and mud particles) represented by kaolin, and suggests a potential ability to separate heavy metals, such as arsenic, from deionized (DI) water suspensions. In previous studies, kaolin settling rates observed in columns treated with mucilage and aluminum sulfate ($Al_2(SO_4)_3$), a common flocculant used commercially in water purification treatment, were compared and mucilage was concluded to cause a greater increase in settling rate when compared to a control with no treatment (Young, K. The Mucilage of *Opuntia ficus indica*: a natural, sustainable and viable water treatment technology for use in rural Mexico for reduction turbidity and arsenic contamination in drinking water. Master's Thesis, University of South Florida, Tampa, 2006; Young, et al., Using the Mexican Cactus as a New Environmentally Benign Material for the Removal of Contaminants in Drinking Water. *Materials Research Society* 2005, 93, 965-966; Young, et al., Cactus goo purifies water. *Science News* 2005). Related tests also indicate that mucilage extracted from the *Opuntia* spp. acts as an efficient coagulant in surrogate turbid water (Miller, et al., Toward Understanding the Efficacy and Mechanism of

*Opuntia* spp. as a Natural Coagulant for Potential Application in Water Treatment. *Environmental Science and Technology* 2008, 42, 4274-4279).

Although nearly all newly derived water purification methods have improved the water quality in developing countries, few have been accepted and maintained for long term use. Field studies indicate that the most beneficial methods use indigenous resources, as they are both accessible and accepted by community they help. In an effort to implement a material that will meet community needs, two fractions of mucilage gum were extracted from the *Opuntia ficus-indica* cactus and tested as flocculation agents against sediment and bacterial contamination. As diatomic ions are known to affect both mucilage and promote cell aggregation, the efficiency of mucilage and $Al_2(SO_4)_3$ or $CaCl_2$) were studied in conjunction with mucilage as a bacteria and particulate removal method. To evaluate performance, tests were conducted in synthetic ion-rich waters that mimic natural water bodies. Hard water (HW) and soft water (SW) were prepared and are two dominant water types found in drinking water sources. The mineral concentration and type found in the water dictates whether it is classified as hard or soft and depends mainly on the mineral content of the soil around the well (Alth, and Alth, *Wells and Septic Systems.* 2nd ed.; TAB Books: 1992; Smith, et al., Methods for preparing synthetic freshwaters. *Water Research* 2002, 36, 1286-1296). Column tests containing suspensions of the sediment kaolin exhibited particle flocculation and settling rates up to 13.2 cm/min with mucilage versus control settling rates of 0.51 cm/min. *Bacillus cereus* tests displayed flocculation and improved settling times with mucilage concentrations lower than 5 ppm and removal rates between 95 and 98% were observed for high bacteria concentration tests (>$10^8$ cells/ml). This natural material not only displays water purification abilities, but it is also affordable, renewable and readily available.

Bacterial flocculation treatments currently used in the field for bacterial flocculation can rely on charge neutralization, double layer compression, bridging, sweep coagulation, or a combination of the above. In charge neutralization, the flocculant binds the bacterial floc surface and neutralizes charges. Double layer compressing, also called salting out, uses large amounts of salts to compress the outer charged layer of the floc, bringing the negative and positively charged layers of the floc closer and reducing the charge effects of the outer layer. Bridging binds floc particles. Sweep coagulation uses large amounts of metal salts to bind the flocs. The salts precipitate as metal oxides.

Inorganic metal salts, like aluminum sulfate ($Al_2(SO_4)_3$) and ferric chloride ($FeCl_3$) act through charge neutralization and sweep coagulation. However, there is a possible link between residual aluminum ions and neurological disorders, such as Alzheimer's disease and dementia.

Organic synthetic polymers currently used, such as polyacrylamide, act through charge neutralization and bridging material. As such, the polyacrylamide adsorbs to the colloidal surface of bacterial, essentially neutralizing the electrical charge on the flocs. Additionally, the polyacrylamide bridges flocs particles together. However, some of the polymers, like acrylamide monomer found in polyacrylamide, has been linked to cancer.

Microbial byproducts are currently being studied as possible flocculants, using glycoproteins, sugars, and amino acids from microbes, such as algae, yeast, fungi, and bacteria. However, these biosynthetic molecules require cations to assist in the flocculation.

It was found that adding a predetermined amount of calcium chloride and an isolate of plant mucilage to a sample of water provided unexpected and efficient removal of at least one contaminant from the water sample. It is noted that the calcium chloride and isolate of plant mucilage may be added to the water concurrently, or independently. Exemplary plant mucilage extracts were obtained from *Opuntia ficus indica*, and in particular the extract was optionally a total mucilage extract, a non-gelling extract from the plant mucilage or a gelling extract from the plant mucilage. Exemplary contaminants that are removed using the composition disclosed here are heavy metals, arsenic, particulate matter, and bacteria, such as those belonging to *Bacillus* and *Escherichia.*

The mucilage extracts were found particularly useful at a final concentration of between 0.01 ppm and 100 ppm, and at a final concentration of 20 ppm and 80 ppm. In specific variants of the invention, a nongelling extract is added to water at a final concentration of between 10 ppm and 30 ppm. However, the extracts have also been found useful at 2.0 ppm, 2.5 ppm, 5 ppm, 10 ppm, 12.5 ppm, and 15 ppm. Variants of the invention using the gelling extract may use the extract at a final concentration of between 0.5 ppm and 25.0 ppm.

Calcium chloride concentrations vary depending on the type of material to be removed from the water, however final concentrations between 10 mM and 35 mM. It was found that 20 mM was a particularly useful concentration, however the invention also works at 15 mM, 25 mM, and 30 mM.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
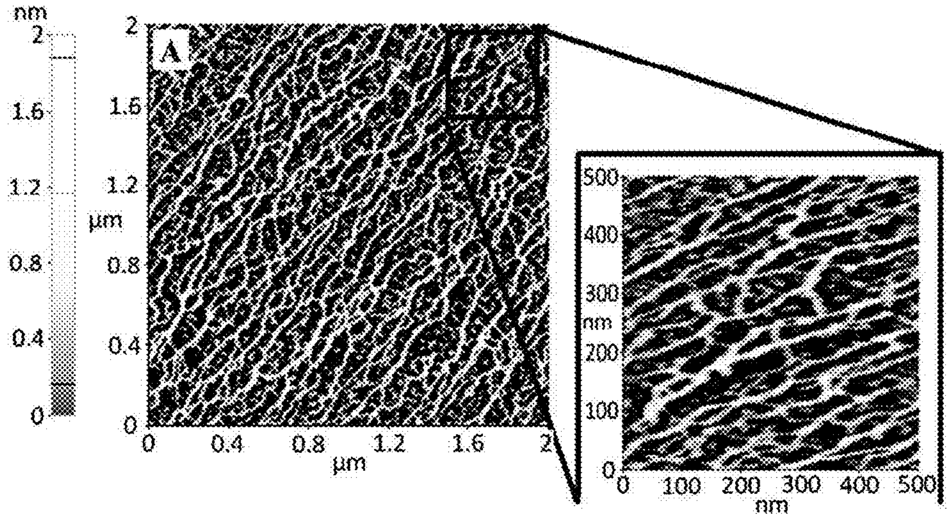
FIGS. 1(A) and (B) are images from Atomic Force Microscopy (AFM) scans of 2×2-nm x-y and 0.5×0.5-nm x-y areas of (A) the GE and (B) the NE stock solutions with final concentrations of 500 ppm suspended in DI water.

Different mucilage were used, alone and in conjunction with calcium chloride, to remove contaminants from water sources. Exemplary uses include removal of heavy metals, gram-positive bacteria, and gram-negative bacteria. The ion concentration, mucilage type and flocculation were studied and compared briefly to the removal ability witnessed with sediments. Gram-positive *Bacillus cereus* (*B. cereus*) and gram-negative *Escherichia coli* (*E. coli*) HB101, that has been transformed to contain a plasmid with a gene encoding the green florescence protein (GFP), were used to study removal of bacteria.

While the gelling extract and nongelling extract both contain polysaccharides, the extracts are composed of different amounts and types. For example, the gelling extract contains 56.3 wt % of uronic acid and derivatives, whereas the nongelling extract contains 11 wt % of uronic acid and derivatives.

As used herein, "added" means applying, contacting, or administering the composition described herein to a water sample. The composition may be added directly to the water and allowed to bind and/or interact with the components of the water. Alternatively, the composition may be partially diluted into a solution having a concentration higher than the final concentration, and the concentrated solution added to the water. The various components may be added together or as distinct components. As a non-limiting example, calcium chloride may be added to the water and dissolved, followed by the mucilage extract.

As used herein, heavy metal is used in its conventional sense, referring to elements and compounds from Group 4 through 8 of the Periodic Table. Heavy metals include, but are not limited to, silver, cobalt, copper, iron, gold, silver, lead, mercury, nickel, zinc, aluminum, tin, manganese, platinum, and arsenic. Heavy metal ions, compounds, salts or nanocrystalline forms of the heavy metals are also included herein.

As used herein "particulate" materials are materials that remain solid when dispersed in water, or are substantially insoluble in water. Non-limiting examples include sand, clay, soil, and non-polar solutes and salts. The particulates may be in any form, such as powders, flakes, beads, pellets, aggregates, fibers and mixtures thereof.

As used herein, bacteria refer to microorganisms in the bacteria domain and bacterial spores and/or vegetative bacteria. Bacteria include, but are not limited to, acid-fast bacteria, gram positive bacteria, and gram negative bacteria. Exemplary acid-fast bacteria include *Myobacterium tuberculosis, Myobacterium avium, Myobacterium leprae, Mycobacterium ulcerans*. Gram positive bacteria include, but are not limited to, Actinomedurae, *Actinomyces israelii, Bacillus anthracia, Bacillus cereus, Clostridium botulinum, Clostridium difficile, Clostridium perfringens, Clostridium tetani, Corynebacterium, Enterococcus faecalis, Listeria monocytogenes, Nocardia, Propionibacterium acnes, Staphylococcus aureus, Staphylococcus epiderm, Streptococcus mutans*, and *Streptococcus pneumoniae*. Gram negative bacteria include, but are not limited to, *Afipia felis, Bacteroides, Bartonella bacilliformis, Bortadella pertussis, Borrelia burgdorferi, Borrelia recurrentis, Brucella, Calymmatobacterium granulomatis, Campylobacter, Escherichia coli, Francisella tularensis, Gardnerella vaginalis, Haemophilus aegyptius, Haemophilus ducreyi, Haemophilus influenziae, Heliobacter pylori, Legionella pneumophila, Leptospira interrogans, Neisseria meningitidia, Porphyromonas gingivalis, Providencia sturti, Pseudomonas aeruginosa, Salmonella enteridis, Salmonella typhi, Serratia marcescens, Shigella boydii, Streptobacillus moniliformis, Streptococcus pyogenes, Treponema pallidum, Vibrio cholerae, Yersinia enterocolitica*, and *Yersinia*. Other bacteria not falling into the other three categories include, but are not limited to, *Bartonella henseiae, Chlamydia psittaci, Chlamydia trachomatis, Coxiella burnetii, Mycoplasma pneumoniae, Rickettsia akari, Rickettsia prowazekii, Rickettsia rickettsii, Rickettsia tsutsugamushi, Rickettsia typhi, Ureaplasma urealyticum, Diplococcus pneumoniae, Ehrlichia chafensis, Enterococcus faecium*, and *Meningococcus*. Without limiting the scope of the invention, the invention is particularly useful on proteobacteria, such as enterobacteriaceae, or firmicutes, like bacillaceae.

As used herein, plant mucilage refers to a substance of polar glycoprotein, which may be extracted from the tissue and/or seeds of various plants such as the plants of the Cactaceae family.

Materials and Methodology

Pads were obtained from an *Opuntia ficus-indica* cactus, originally purchased from Living Stones Nursery in Tucson, Ariz. then replanted and cultivated in Tampa, Fla. The pads were processed resulting in GE and NE mucilage fractions according to the protocol outlined by Goycoolea and Cardenas with the following specifications and alterations (Goycoolea, and Cardenas, Pectins from *Opuntia* spp.: A short review. *Journal of the Professional Association for Cactus Development* 2003, 5, 17-29). The pads were steamed then liquidized with a 10 speed Osterizer blender. The pH was adjusted to 7 and the solids were separated using an Accuspin 400 centrifuge (Fisher Scientific) with a 4-place swinging bucket Rotor (Fisher Scientific) and a centrifugal force of 2522×g for 10 minutes. The precipitate was removed and used in the extraction of GE and the supernatant was reserved for the acquisition of NE. A 50 mM NaOH with 0.75% sodium metaphosphate solution was added to the precipitate and stirred for thirty minutes. The pH was then adjusted to 2, the mixture was centrifuged and the supernatant discarded. The precipitate was resuspended in DI water and the pH was increased to 8. This suspension was then filtered via vacuum filtration with a filter cut from a 100% continuous filament, double knit polyester cloth (Berkshire, Co.). The portion of the original suspension that was reserved for the extraction of NE was then mixed with a 1M NaCl and filtered using a #41 Whatman filter and a vacuum filtration system. The filtrates of both the NE and GE portions of the extraction were separately mixed with acetone (1:1 volume ratio) and left overnight allowing additional water to evaporate. The recovered mucilage was then removed and washed in isopropanol using a 1:1 volume ratio. The mucilage was spread upon a sterile petri dish and allowed to dry. When dry, the mucilage was ground using a mortar and pestle and stored on the bench top in sealed containers until needed. Prior to experimentation the resulting mucilage powder was evenly dispersed in DI water using a Pyrex Tenbroeck tissue grinder (Fisher Scientific) with final stock concentrations of 500 ppm. The unused mucilage suspension was stored in the refrigerator, sealed with wax film, for future use.

Synthetic waters were prepared as outlined by Smith, Davison and Hamilton-Taylor (Smith, et al., Methods for preparing synthetic freshwaters. *Water Research* 2002, 36, 1286-1296). Preparation included the addition of several salts to DI water to better represent the environmental bodies of water found throughout the world. The preparation of these waters include the mixing of several solutions of salts dissolved in DI water, resulting in high ion-concentration water (HW) and low ion concentration water (SW). The materials used during the preparation of the surrogate waters can be found listed in Table 2.

TABLE 2

Synthetic water materials.

| Name | Manufacturer | Catalog # | Lot # | Description |
|---|---|---|---|---|
| Calcium Nitrate Tetrahydrate ($Ca(NO_3)_2 \cdot 4H_2O$ | MP Biomedicals | 193800 | 6343E | 100 g, Ultra Pure |
| Potassium Phosphate | Acros | 205920025 | A02409 51 | 2.5 kg, 99+%, Ultra Pure |
| Sodium Sulfate Anhydrous Sodium Sulfate ($Na_2SO_4$) | Acros | 35425-0010 | B0123472 | 1 kg, Granular |
| Potassium Bicarbonate | MP Biomedicals | 152557 | 5477H | 1000 g, Reagent Grade |
| Calcium Chloride Hexahydrate ($CaCl_2 \cdot 6H_2O$) | Acros | 389250010 | A02315 11 | 1 kg, Extra Pure |
| Sodium Bicarbonate ($NaHCO_3$) | Fisher Scientific | S233-500 | 073814 | 500 g |
| Magnesium Chloride Hexahydrate ($Cl_2Mg \cdot 6H_2O$) | Acros | 197530010 | A02452 68 | 1 kg, 99% |

TABLE 2-continued

Synthetic water materials.

| Name | Manufacturer | Catalog # | Lot # | Description |
|---|---|---|---|---|
| Magnesium Sulfate Heptahydrate | Acros | 423905000 | A02370 24 | 500 g, 98+% |
| Calcium Chloride ($CaCl_2$) | MP Biomedicals | 153502 | 9645E | 500 g |
| 500 mL Filter | Fisher Scientific | S66128 | 638611 | 0.20 μm Cellulose Nitrate membrane, sterile |
| 50 mL Filter | Corning | 430320 | 302085 05 | 0.22 μm Cellulose Acetate membrane, sterile |
| Compressed Nitrogen | Airgas | NI HP300 | — | Minimum Purity 99.995%, gas cylinder |
| Compressed Air | Airgas | AI UZ300CT | — | Ultra High Purity, Certified |
| Compressed Carbon Dioxide | Airgas | CD R300 | — | Research Grade |
| Deionized Water (DI) | Millipore System | A10 | F4BN7 4788 | DI Feed Water, Ion-Exchange, Activated Carbon |

Stock solutions were prepared to mix the high-ion concentrated water (HW) and the low ion concentrated/soft water (SW). The stock solutions prepared are outlined in Table 3 along with the amount of chemical added, the final concentration and the final ion-concentrations. HW stock solutions 1, 3, and 4 required the salts to be added to DI water using a stir bar. Smith et al. advises that, if kept in a cool shaded place, these solutions will not expire and can be used for future water preparations. Because Calcium Oxide (CaO) is harder to dissolve than the other salts and requires the water to be stripped of carbon dioxide ($CO_2$), the water was bubbled with compressed nitrogen ($N_2$) gas for one hour using a nitrogen blanket created with a grocery bag. The bubbling was achieved using standard tubing with holes punctured approximately six inches up from the bottom using a screw. This tube was submerged in the water while it was stirred with a stir bar allowing the bubbles to fill the container. The appropriate amount of CaO was then added to the water and was then bubbled with $N_2$ for another hour until the CaO was completely dissolved. The solution was then bubbled for 10 minutes, decreasing the pH and preventing the formation of any unwanted precipitates as outlined by Smith et al.

TABLE 3

Concentrations of synthetic water stock solutions.

| Chemical | Amount (g) | Conc (M) | SS Ion Conc (g/L) $C^{z+}$ | $A^{Z-}$ |
|---|---|---|---|---|
| Soft Water (SW) | | | | |
| Stock Solution 1: 1 L prepared, 1/1000 dilution factor | | | | |
| Magnesium Chloride Hexahydrate | 12.17 | 0.060 | 1.455 | 4.244 |
| Calcium Chloride Hexahydrate | 17.49 | 0.080 | 3.200 | 5.661 |
| Calcium Nitrate Tetrahydrate | 3.541 | 0.015 | 0.601 | 1.859 |
| Stock Solution 2: 5 L prepared, 1/1.1 dilution factor | | | | |
| Calcium Oxide | 0.094 | 0.0003 | 0.014 | 0.001 |

TABLE 3-continued

Concentrations of synthetic water stock solutions.

| Chemical | Amount (g) | Conc (M) | SS Ion Conc (g/L) $C^{z+}$ | $A^{Z-}$ |
|---|---|---|---|---|
| Stock Solution 3: 1 L prepared, 1/1000 dilution factor | | | | |
| Sodium Sulfate | 16.34 | 0.115 | 5.290 | 11.05 |
| Potassium Bicarbonate | 2.508 | 0.025 | 0.999 | 1.528 |
| Sodium Bicarbonate | 1.681 | 0.020 | 0.460 | 1.220 |
| Hard Water (HW) | | | | |
| Stock Solution 1: 1 L prepared, 1/100 dilution factor | | | | |
| Calcium Chloride Hexahydrate | 7.497 | 0.034 | 1.372 | 2.426 |
| Calcium Nitrate Tetrahydrate | 1.189 | 0.005 | 0.202 | 0.624 |
| Stock Solution 2: 5 L prepared, 1/1.1 dilution factor | | | | |
| Calcium Oxide | 0.458 | 0.002 | 0.066 | 0.005 |
| Stock Solution 3: 1 L prepared, 1/100 dilution factor | | | | |
| Sodium Sulfate | 2.820 | 0.020 | 0.913 | 1.907 |
| Potassium Bicarbonate | 0.763 | 0.008 | 0.304 | 0.465 |
| Sodium Bicarbonate | 2.265 | 0.027 | 0.620 | 1.645 |
| Potassium Phosphate | 0.47 | 0.003 | 0.108 | 0.262 |
| Stock Solution 4: 1 L prepared, 1/100 dilution factor | | | | |
| Magnesium Sulfate | 10.05 | 0.041 | 0.991 | 3.915 |

The stock solutions were then mixed according to Table 4, which also indicates the final pH of the solution after bubbling with compressed air. The stock solutions were Three (SW) to Four (HW) stock solutions consisting of $MgCl_2.6H_2O$, $CaCl_2.6H_2O$, $Ca(NO_3)_2.4H_2O$, $Na_2SO_4$, $KHCO_3$, $NaHCO_3$, $K_3PO_4$, $MgSO_4$ (HW only), and CaO were prepared separately to avoid supersaturating the water and were then mixed accordingly. Gases used in the production process ($N_2$, $CO_2$ and Air) for pH changes and oxygen removal were high pressure, ultrapure gases from Airgas, Inc. Final pH, after equilibrium was reached, was determined to be 7.43 for the SW and 8.34 for the HW. Both synthetic waters were filtered using a 0.20 μm Cellulose Nitrate membrane filter (Fisher Scientific) to remove any bacterial contamination that occurred during preparation.

TABLE 4

Characteristics of stock solutions for mixing 5 L of soft water (SW) and hard water (HW).

| | SS 1 (ml) | SS 2 (mL) | SS 3 (mL) | SS 4 (mL) | DI Water (mL) | Total Vol (mL) | Final pH |
|---|---|---|---|---|---|---|---|
| Soft Water | 5 | 4545 | 5 | — | 445 | 5000 | 7.43 |
| Hard Water | 50 | 4545 | 50 | 50 | 305 | 5000 | 8.34 |

Upon completion, the water was stored on the bench top at room temperature and, prior to use, 500 mL of the waters were filtered using a vacuum pump and bottle top filters with 0.20 μm membranes, sterilizing the water for use. The SW and HW were also used to produce calcium chloride ($CaCl_2$) solutions that were tested with kaolin and used in bacteria tests. Stock solutions of $CaCl_2$) were prepared in both HW and SW and were then filtered using a vacuum pump and bottle top filters with 0.22 μm membranes, sterilizing the solution for later use. The solution was then diluted accordingly for each experiment.

*Bacillus cereus* (ATCC 10876) and *Escherichia coli* were cultured overnight in Luria-Bertani (LB) media in an Orbital Incubator Shaker, model Gyromax 727 (Amerex Instruments Inc), operated at 35° C. and 200 rpm. Supplies used in preparing the bacteria are described in Table 5. Initial bacteria cell counts were performed prior to column inoculation using a cellometer cell counting chamber (Nexcelom Bioscience). The bacteria were then washed once in PBS using a mini vortexer and a cell pellet collected using a centrifugal force of 2,522×G for 5 min. Cells were resuspended in 15 mL of PBS to a final stock solution cell count of $10^9$ cells/mL, resulting in a final column cell count of $10^8$ cells/mL.

TABLE 5

Materials used in bacteria growth and evaluation.

| Name | Manufacturer | | | Catalog # |
|---|---|---|---|---|
| *Bacillus cereus* | Frozen stock already in lab | | | ATCC 10876 |
| *Escherichia coli* pGLO Bacterial Transformation Kit | BioRad | 166-0003EDU | — | ATCC 33694 |
| Yeast Extract | Fisher Scientific | BP1422-500 | 076094 | 500 g |
| Tryptone | Acros | 61184-5000 | B0124145 | 500 g |
| Sodium Chloride (NaCl) | Acros | 42429-5000 | B0113819 | 99+% |
| Agar | MP Biomedicals | 100262 | 8388F | USP Grade, 80-100 mesh |
| Ampicillin Sodium Salt ($C_{16}H_{18}N_3O_4SNa$) | MP Biomedicals | 194526 | R21558 | Crystalline, Cell Culture Reagent |
| L-(+)-Arabinose ($C_5HO_6$) | MP Biomedicals | 100706 | 8590J | Crystalline, Purity: >98% |
| Petri-dishes | Acros | 0875798 | — | 100 × 15 mm |
| Orbital Incubator Shaker | Amerex | Gyromax 727 | — | 20-420 rpm Ambient Temp +5-80° C. |
| Cellometer Cell Counting Chamber | Nexcelom Bioscience | CP2-002 | — | Plastic Disposable Counting Grid |

Unlike kaolin, *B. cereus* did not form a visible interface while settling. The time when flocs began to appear as small white flecks in the otherwise turbid water to the time that the flocs ceased to fall was recorded. These times were then compared to evaluate the effects of concentration and water type. Box plots were used to represent settling times, where the bottom of the box indicates the start time of the floc formation, while the top indicates the time when flocs were no longer falling in the column. The dotted lines represent the start (lower line) and completion time (upper line) of the control columns containing only $CaCl_2$ without the presence of mucilage, as the addition of $Ca^{2+}$ alone does result in flocculation. Anhydrous $CaCl_2$ (MP Biomedicals) was suspended in the synthetic water of choice and filtered using a 0.22 μm cellulose acetate tube top filter (Corning) to remove any bacterial contaminants prior to initiating experiments.

In bacteria tests where removal percentage was evaluated, plate counts were performed according to standard microbiology procedures (Bauman, *Microbiology*. Pearson Education, Inc.: San Francisco, Calif., 2004; Ingraham and Ingraham (ed.), *Introduction to Microbiology*. 2nd ed.; Brooks/Cole: Pacific Grove, Calif.: 2000; Lim, *Microbiology*. 3rd ed.; Kendall/Hunt 2003). Once the flocs in the treated columns had completed their descent, a 1 mL sample was taken from the top of the column and counted. The resulting bacteria count was then compared to the initial count and a removal rate was obtained. Following the column tests, samples from both kaolin and *B. cereus* columns were extracted for imaging.

Dynamic Light Scattering (DLS) outputs were obtained from a DLS manufactured by Malvern Instruments and were used to evaluate kaolin particle sizes using standard cuvettes.

Transition Electron Microscope (TEM) images were obtained using a Morgagni 268D TEM with Formvar/Carbon 150 Mesh Copper grids from Electron Microscopy Sciences (FCF150-Cu-50) and were used to determine the kaolin particle size as well as evaluate the flocs observed in kaolin columns. A 1 mL sample from the top of columns containing kaolin was taken for imaging on the TEM and 20 μL of the sample was deposited on copper grids and left to soak for 5 minutes. The remaining liquid was then removed using the tip of a KimWipes® sheet and the grid left to dry overnight for imaging.

Atomic Force Microscope (AFM) scans of GE and NE were obtained using a XE-100 AFM purchased from PSIA 100 and were imaged on mica surface (ASTM V-1 quality) purchased from Axim Mica. The images were produced with aluminum TAP300A1 cantilevers (average force constant of 40 N/m) purchased from Budget Sensors using non contact mode.

Using small valves attached to the bottom of the columns, the flocs formed at the bottom of *B. cereus* columns were removed for imaging. Images were collected with a light microscope using 10 μL of the removed solution and a cover slip.

Simple column tests were used to evaluate the flocculation effects of the mucilage. The column contents were mixed to 10 mL in 15 mL centrifuge tubes. The tubes were vortexed and poured into column arrays which were observed over a period of time and the changes witnessed in the columns were recorded. Fisherbrand serological 10 mL pipettes with the ends wrapped in parafilm, were used for all column arrays. Because of the flocculating abilities of the diatonic ion $Ca^{2+}$, and its effects on the mucilage, $CaCl_2$ solutions of various concentrations were prepared and tested with kaolin and bacteria. For both kaolin and bacteria tests the column contents were added together in 10 mL centrifuge tubes, then vortexed before being poured into the column array. Experiments were performed at least three times for reproducibility and statistical information was calculated using OriginLab Data Analysis and Graphing Software.

Kaolin (hydrated aluminum silicate; Fisher Scientific, 571954) was used for sediment settling tests. Kaolin suspensions with final concentrations of 50 g/L were set up in the appropriate water type at least 24 hours prior to the run of the experiment to allow the kaolin particles thorough hydration time (Young, K. The Mucilage of *Opuntia ficus indica*: a natural, sustainable and viable water treatment technology for use in rural Mexico for reduction turbidity and arsenic contamination in drinking water. Master's Thesis, University of South Florida, Tampa, 2006; Young, et al., Using the Mexican Cactus as a New Environmentally Benign Material for the Removal of Contaminants in Drinking Water. *Materials Research Society* 2005, 93, 965-966; Young, et al., Cactus goo purifies water. *Science News*

2005). Kaolin suspensions with final concentrations of 50 g/L were used in the column tests evaluated in this thesis and mimic the possible mud-like conditions in water storage units. The settling rates were determined and plots were generated for comparison between different waters, mucilage type and concentrations. Tests were run with varying mucilage concentration in SW, HW and DI waters. In addition, the use of the common flocculant Alum was also evaluated for comparison.

In order to relate the effects of the mucilage on the kaolin with the effects on *B. cereus,* 1 mL of 0.01 M phosphate buffered saline (PBS) with a pH of 7.4 (Sigma), was added to the suspension. In column tests of specific concentrations, kaolin has been observed to form a clear interface which was read every minute for up to sixty minutes and the volume marker at the interface was recorded for later plotting. These plots were truncated where compression in the column began and the settling rate in cm/min of the column was obtained. These settling rates were then plotted against the mucilage concentration and the resulting relationship evaluated. By plotting multiple relationships on the same graph the influence of ion rich water on mucilage induced particle aggregation was observed.

Bacteria tests were evaluated with high bacteria concentrations of $1\times10^8$ cells/mL, in order to make the effect of mucilage addition easier to see. Unlike kaolin columns, bacteria columns do not form a clear interface, but rather small flocs, which can be seen forming and falling in the otherwise turbid water. The time from which these flocs began to form to the time that they completed their descent was recorded and compared for various treatments conditions. All results shown are the average and standard deviation of at least three settling tests and all statistics were calculated using Origin 8.

Example 1: Mucilage Extract Properties

Figure 1B:
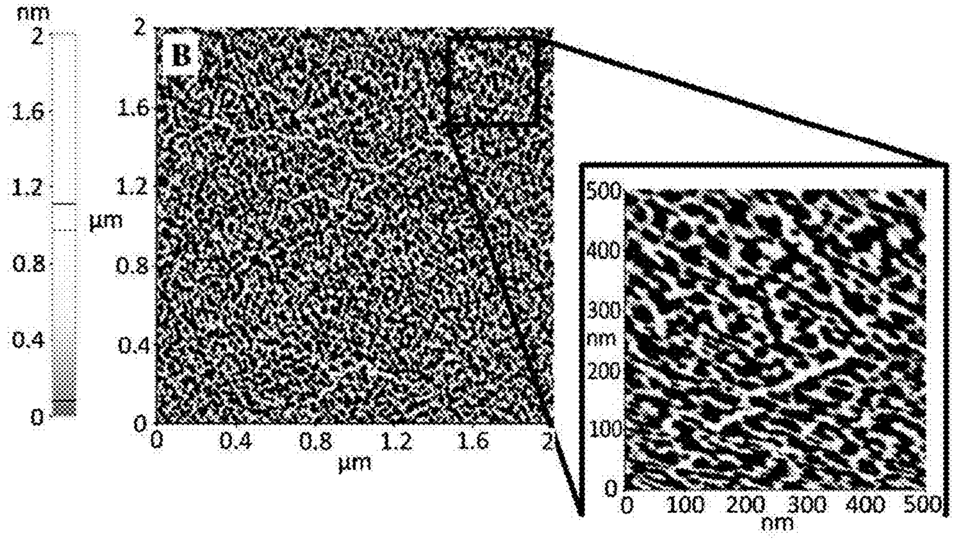

Images of mucilage were obtained using both AFM and TEM techniques. The AFM scans were of both the GE, seen in FIG. 1(A), and NE, seen in FIG. 1(B), stock solutions (500 ppm) with scanned areas of 2×2-μm x-y and 0.5×0.5 μm x-y, seen in FIG. 1. The scans of the GE displayed an orderly chain-like structure with similar orientation angels, while those of the NE showed a denser net-like structure with a uniform distribution. Maximum heights of 2.011 nm (GE scans) and 1.42 nm (NE scans) were recorded by the AFM. The structural differences were similar to those observed with the TEM (not shown) and potentially contribute to the different removal mechanisms observed between the two fractions of mucilage. Results from the extraction were recorded as the mass of both GE and NE extracted, which represents the mass of the dried mucilage over the initial pad mass, as well as the percent yield. Table 6 presents a summary of the mucilage extraction.

TABLE 6

Summary of Gelling Extract (GE) and Non-Gelling Extract (NE) extraction.

| PAD | NE Extracted (g) | % Yield GE Extracted (g) | GE Extracted (g) | % Yield |
|---|---|---|---|---|
| 1 | 1.3835 | 0.40 | N/A | N/A |
| 2&3 | 2.7488 | 0.51 | 0.801 | 0.15 |
| 4-1 | 3.1976 | 1.46 | N/A | N/A |
| 4-2 | 2.2384 | 1.02 | N/A | N/A |
| Total | 9.5683 | 0.73 | 0.801 | 0.0612 |

The NE and GE mucilage was compared to other mucilage extracts formed via different methods, i.e. comparative mucilage.

The ground cactus mucilage sample was formed by cleaning and cutting cactus pads as described in the Materials and Methods section. The pads were then boiled at 80° C. for 20 min and liquidized to form a suspension. The pH of the suspension was neutralized to 7 using HCl and dried at 60° C. for 48-60 hours. The dry mucilage was ground to form a powder and sieved.

Mucilage formed from the dice-boil-press method was obtained using sections of cactus pads that were cleaned and cut as described previously. The sections were boiled in a 1M NaCl solution for 10 minutes and placed in a potato press. The liquids were removed from the extract and the solids from the press were suspended in about 300 mL of ethanol and mucilage precipitated by hand stirring from the remaining solids. The precipitate was washed with ethanol, dried and ground.

Mucilage formed from the cut-spoon-press method was obtained using sections of cactus pads that were sliced length wise and soaked in 1M NaCl, cleaned and cut as described previously. The sections were scraped into a potato press and the liquids removed. The solids from the press were suspended in water and mucilage precipitated from the remaining solids using 600 ml isopropanol. The precipitate was washed with isopropanol, dried and ground.

Figure 2:
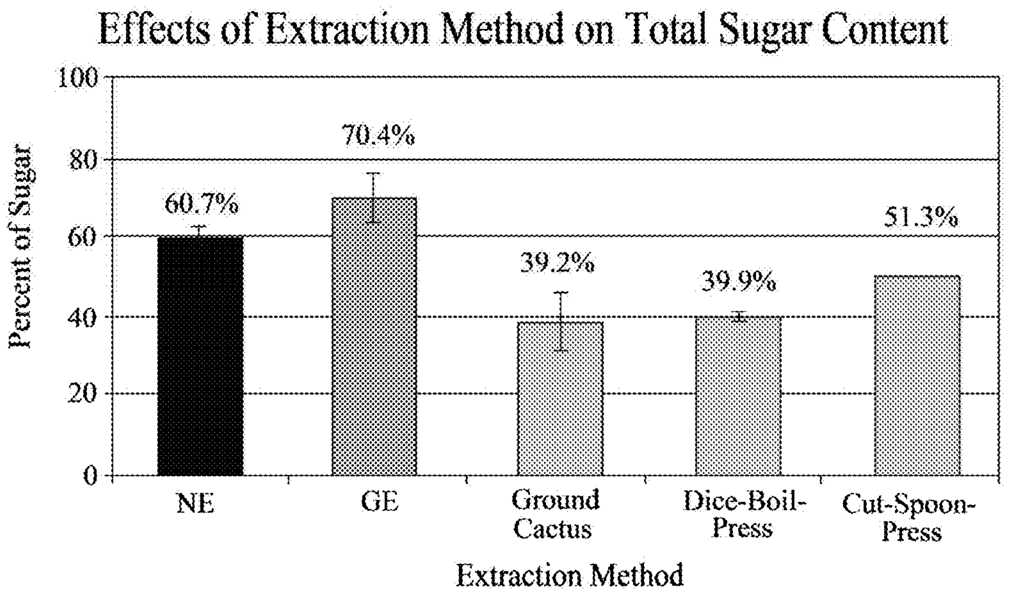
FIG. 2 is a graph showing the differences in sugar content in mucilage formed from various extraction methods. Sugar content was determined using the phenol-sulfuric acid assay.

The mucilage from each extraction, as well as NE and GE from the Materials and Methods, were tested for sugar composition using a phenol-sulfuric acid assay (Saha & Brewer, Determination of the concentrations of oligosaccharides, complex type carbohydrates, and glycoproteins using the phenol-sulfuric acid method. Carbohydr Res. 1994 Feb. 17'254:157-67). Total sugar content was highest in GE mucilage, at 70.4%, as seen in FIG. 2, with NE mucilage displaying the next highest sugar content at 60.7%. The comparative samples, i.e. ground cactus, dice-boil-press mucilage, and cut-soon-press mucilage, all had considerably less sugar content than the NE or GE samples, as seen in FIG. 2. To further compare the prepared samples, nongelling extract and gelling extract were formed using the methodology of Goycoolea & Cardenas (Goycoolea, and Cardenas, Pectins from *Opuntia* spp.: A short review. *Journal of the Professional Association for Cactus Development* 2003, 5, 17-29), resulting in total sugar percentages of 69.8% and 53%, for the gelling and nongelling extracts, respectively.

Figure 3:
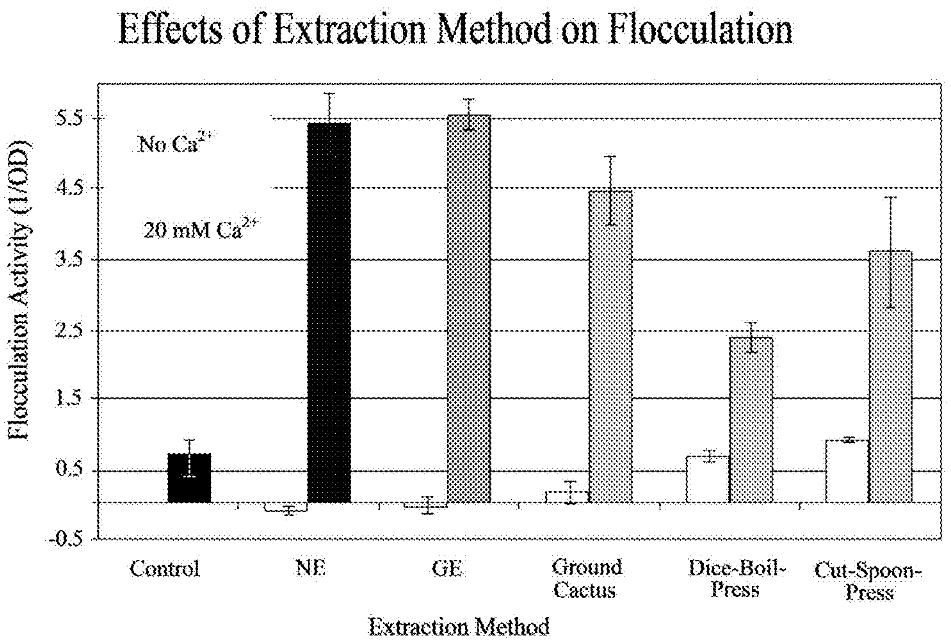
FIG. 3 is a graph showing the differences in flocculation potential in mucilage formed from various extraction methods. 15 mg/L mucilage were used to flocculate 0.5 g/L kaolin suspended in distilled, deionized water.

An analysis of flocculation potential was tested using distilled-deionized water containing 0.5 g/L kaolin suspension. 15 mg/L of the mucilage samples, i.e. NE, GE, ground cactus, dice-boil-press mucilage, and cut-soon-press mucilage, were added to their respective suspensions with or without calcium and allowed to flocculate the kaolin. A control without any calcium or mucilage was tested as a negative control. Results showed the mucilage exhibits no inherent flocculation ability, as none of the samples increased flocculation above the control without calcium, as seen in FIG. 3. Of note, NE and GE displayed the worst flocculation activity of all the mucilage. However, addition of calcium increased flocculation. In fact, NE and GE with 20 mM calcium exhibited the highest flocculation activity of all the samples. The comparative samples, ground cactus, dice-boil-press mucilage, and cut-soon-press mucilage, all increased flocculation with addition of calcium, but to significantly lower levels than NE and GE.

Example 2: Kaolin Removal With Cactus Mucilage

Figure 4:
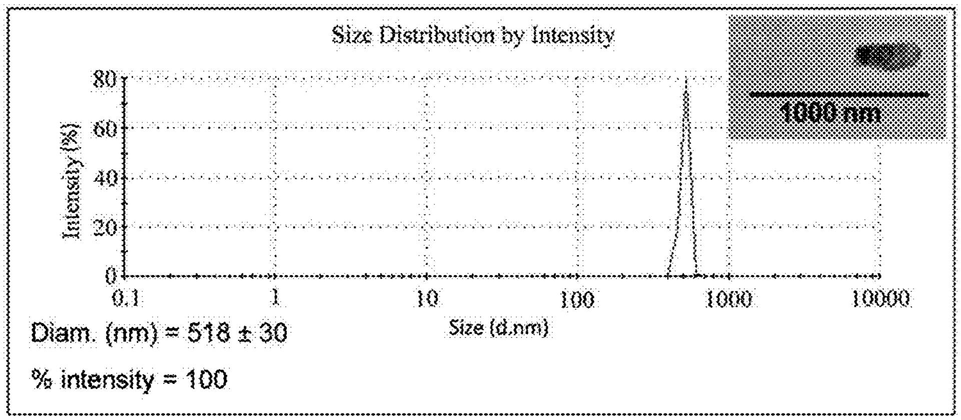
FIG. 4 is a graph showing a size distribution plot created using Dynamic Light Scattering (DLS). Output depicts a particle diameter size of 518±30 nm, which is confirmed by the Transition Electron Microscope (TEM) image in the upper right hand corner.

Kaolin particle size was unknown and was evaluated using DLS and TEM imaging, seen in FIG. 4. There was not a wide distribution of sizes, indicated by the sharpness of the peak, and the output showed a particle size of approximately 518 nm±30 nm. TEM images at a magnification of 28,000× were obtained for GE and NE, and confirmed this size. It was also noted that the image of the GE displays an orderly chain-like structure with almost the same angle of orientation. Conversely, NE images show a denser net-like structure with cell sizes of approximately 200 nm.

Figure 5:
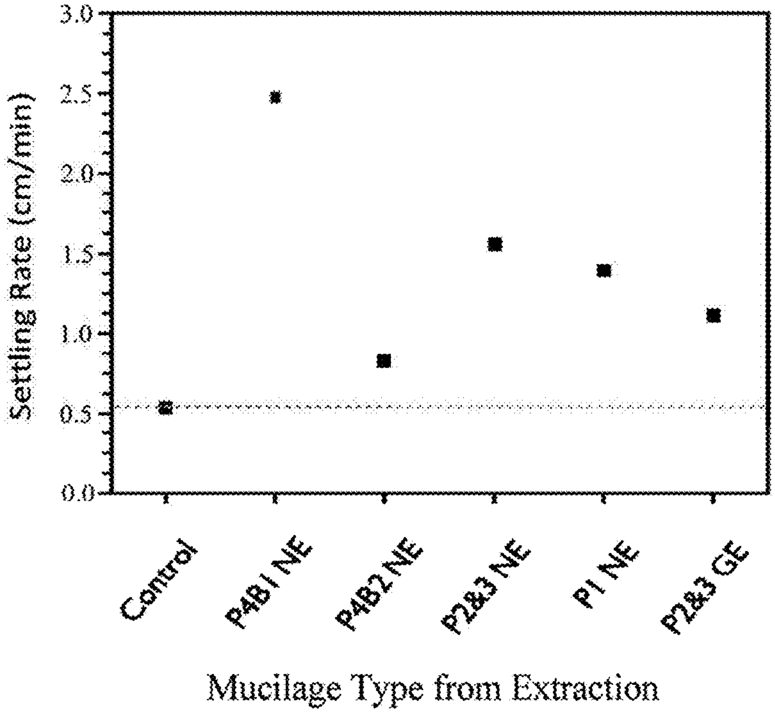
FIG. 5 is a graph showing mucilage tests on kaolin suspended in DI water (50 g/L). Settling rates suggest that all mucilage induces settling faster than no treatment.

FIG. 5 shows the removal rates of kaolin (50 g/L) when treated with the mucilage obtained from the extraction with a final concentration of 2 ppm. The mucilage extracts were found to induce higher settling rates in kaolin than the untreated control, with differences in settling rates potentially due to the purity of the extraction.

Figure 6A:
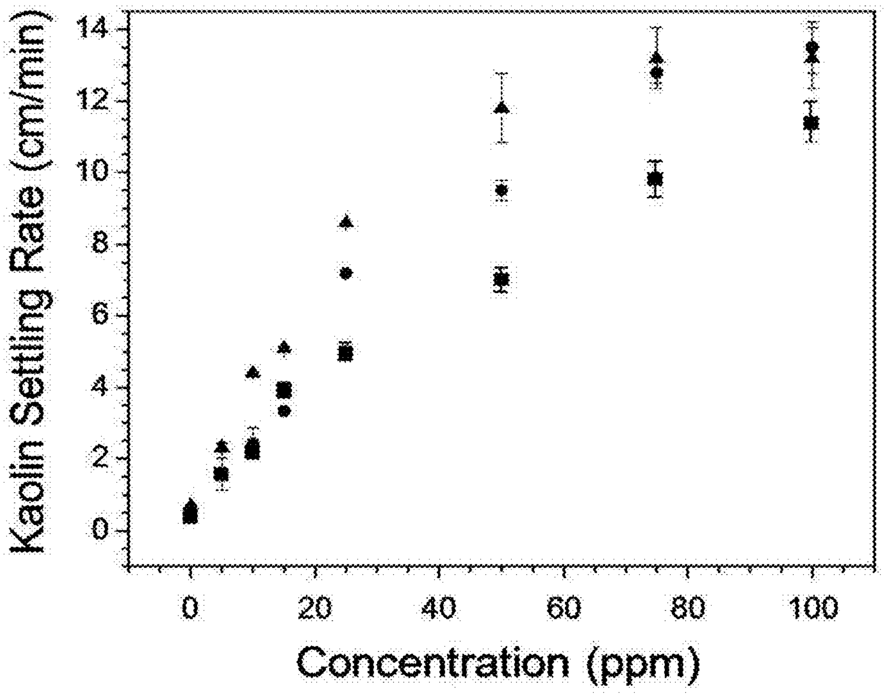
FIGS. 6(A) through (C) are graphs showing the effects of (A) NE; and (B) GE with concentrations ranging from 0-100 ppm on the settling rate of kaolin suspensions. Settling rates of kaolin (50 g/L) suspended in Hard (▲), Soft (●), and DI water (■). (C) Settling rates of kaolin suspensions (50 g/L) in Hard Water treated with Aluminum Sulfate, $Al_2(SO_4)_3$ concentration ranges from 0-500 ppm. Error bars provided are the results of three separate trials.
Figure 6B:
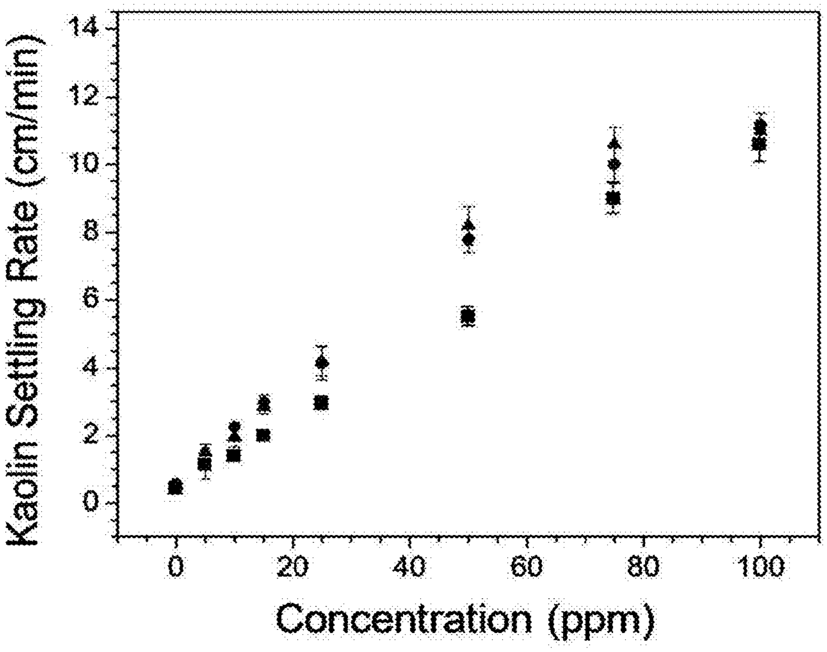
Figure 6C:
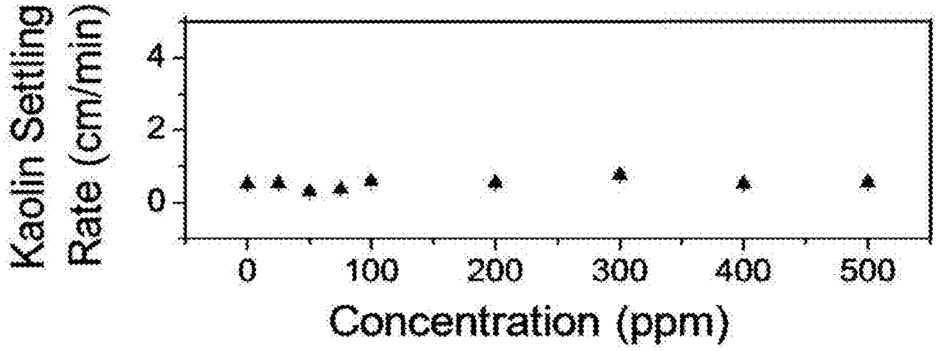

Kaolin suspensions in HW, SW and DI waters were treated with GE and NE concentrations ranging from 0 to 100 ppm, which demonstrated three characteristics of the mucilage-induced settling, seen in FIGS. 6(A) through (C). First, it was observed that as mucilage concentration, both of NE and GE, increased so did the settling rate of the kaolin regardless of water type. Initially, the relationship between concentration and settling rate appeared to be linear but as the concentration of mucilage increased, a point was observed where the kaolin's settling rate began to level off, indicating that an optimal concentration of mucilage exists and an equilibrium value had been reached. Secondly, from these plots the influence of ion-rich water on the mucilage was discerned. It was observed that with no mucilage treatment, all kaolin suspensions settled at a rate close to 0.51 cm/min, indicating that any differences observed among the treated suspensions were primarily due to ion interaction with the mucilage. Studying the plot of settling rate versus NE concentration, seen in FIG. 6(A), it was observed that as concentration increases so did the influence the ions in the water have on the flocculation. From a concentration of 20-75 ppm, settling rates differed heavily depending on water type.

Analyzing the linear portions of the plots, seen in FIGS. 6(A), and (B), and comparing the settling rates with respect to mucilage concentration, seen in Table 7, demonstrated the influence of ion-rich water on the treatment. Kaolin treated with NE produced average increases of 38.54% and 38.24% between DI water and SW, and between SW and HW suspensions. A difference of 61.98% was determined among suspensions in DI water and HW. In kaolin suspensions treated with GE, the settling rate/mucilage concentration differences among water types were not observed to be as severe. An average increase amid suspensions of DI water and SW was 13.18% while the increase between SW and HW was determined to be 15.44%. Average increases of 26.58% were observed between DI water and HW suspensions. The disparity in the percent differences between GE and NE treated suspensions suggest that the NE had a more significant impact on the removal of kaolin from contaminated water. In HW columns containing 100 ppm NE, an average settling rate of 13.2 cm/min was observed, while HW columns with GE only achieved an average settling rate of 11 cm/min. Suspensions of SW and DI water displayed similar differences. Average differences in settling rate/mucilage concentration between GE and NE treated kaolin were determined to be 5.68% in DI water, 33.12% in SW and 51.16% in HW suspensions. Efficiency variation between the mucilage types is likely attributed to the previously mentioned structural distinctions observed in the AFM scans, seen in FIG. 1. Due to the small size of the kaolin particles, the tighter packed mucilage structure exhibited by the NE could potentially be more efficient at entrapping and aggregating kaolin particles than the less dense more spread out structure found with the GE.

TABLE 7

Settling rates with respect to mucilage concentration (cm/min/ppm) provided for GE and NE treatment of 50 g/L kaolin suspensions in DI water, SW and HW.

| Mucilage Type, Water Type | Change in settling rate/mucilage concentration (cm/min/ppm) | Mucilage Type, Water Type | Change in settling rate/mucilage concentration (cm/min/ppm) |
|---|---|---|---|
| GE, DI Water | 0.11 ± 0.00 | NE, DI Water | 0.12 ± 0.01 |
| GE, SW | 0.13 ± 0.01 | NE, SW | 0.19 ± 0.02 |
| GE, HW | 0.15 ± 0.00 | NE, HW | 0.31 ± 0.02 |

Also shown in FIG. 6(C) is the settling rate of mucilage columns treated with $Al_2(SO_4)_3$. Kaolin suspended in HW was used as HW yielded the best results with mucilage. Experiments with $Al_2(SO_4)_3$ concentrations ranging from 0-500 ppm show little to no increase in settling rate when compared to the control, as seen in FIG. 6(C), indicating that at low concentrations of treatment, mucilage is a more efficient and effective flocculating agent for sediment contaminated waters.

At higher mucilage concentrations (approximately 15-100 ppm), consistency changes in the kaolin were observed from the resulting flocculation in DI water, SW and HW, as well as columns treated with NE (data not shown). TEM images of samples obtained from kaolin suspensions with no treatment and with a 50 ppm GE treatment provided a microscopic confirmation of the flocculation observed. All samples imaged from the control columns displayed very similar TEM results. Single kaolin particles were found spread out in the sample, indicating that no flocculation had taken place in the absence of mucilage. In samples taken from columns containing mucilage, flocs of kaolin particles were observed, verifying the presence of larger particle aggregation with the treatment of higher GE concentrations. Similar flocs were observed from columns tested with HW and SW as well as those containing NE. TEM images of kaolin treated with $Al_2(SO_4)_3$ showed some flocs of kaolin although not to the degree observed. Similar results were obtained from all treated and untreated columns when samples were observed with a light microscope (not shown).

Figure 7A:
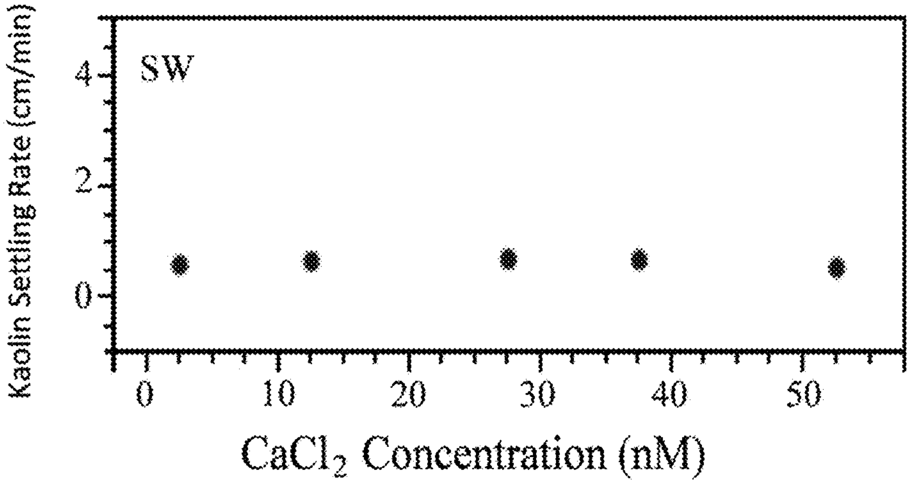
FIGS. 7(A) and (B) are graphs showing kaolin treated with $CaCl_2$ in SW and HW. Results demonstrate the use of calcium chloride on the settling rate of kaolin suspended in (A) soft water (SW) and (B) hard water (HW). The addition of $CaCl_2$ is not seen to play a significant role on the settling rate when compared to the untreated column.
Figure 7B:
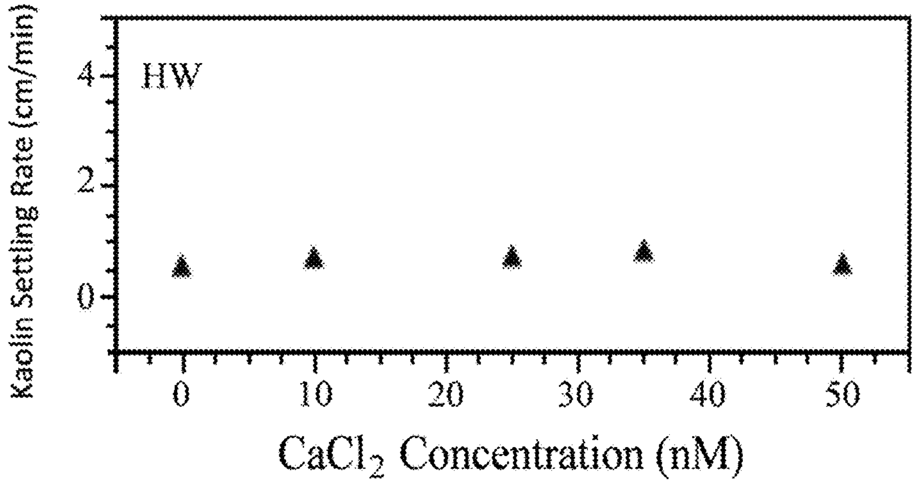
Figure 8:
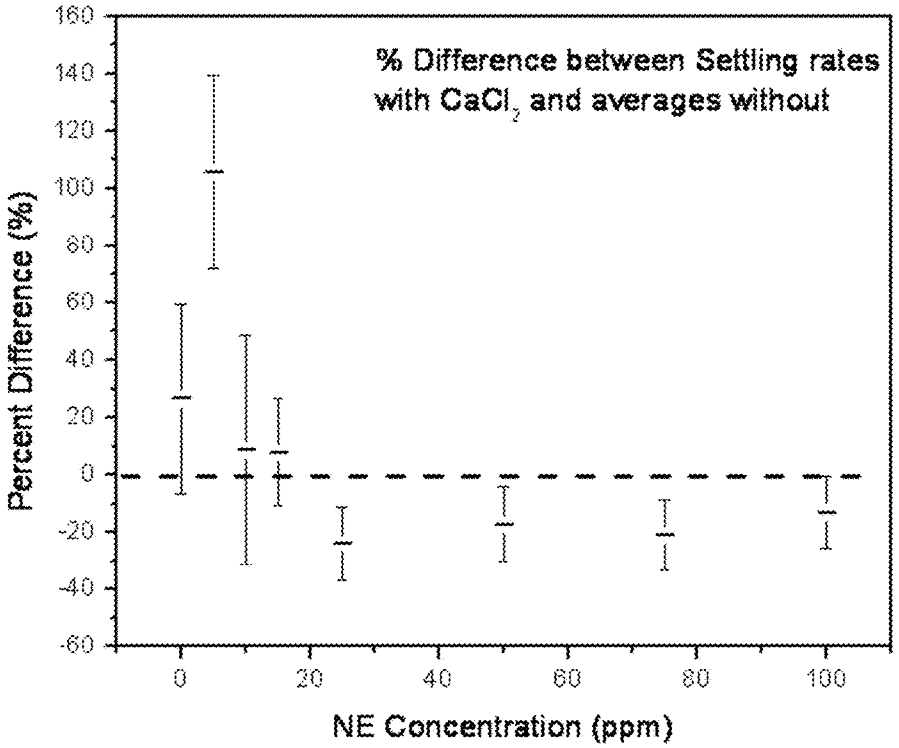
FIG. 8 is a graph showing the effects of 20 mM $CaCl_2$ on different amounts of NE extract on kaolin flocculation. The addition of $CaCl_2$ enhances the settling rate when added with low concentrations of NE extract.

To determine the effect of diatonic Ca' ions on kaolin binding, $CaCl_2$ solutions were prepared and added to columns containing kaolin suspended in SW and HW with final concentrations of 0-50 mM. FIGS. 7(A) for SW and 7(B) for HW show the results from these tests prepared using the same method as the previously plotted kaolin results. Although at some concentrations the settling rate appears to have increased slightly compared to the control, these increases are not significant when compared to the increases observed with the addition of mucilage. However, 20 mM $CaCl_2$ interacts positively with the mucilage extracts to enhance the settling rate in the kaolin, as evidenced by the positive and large percent difference in settling in FIG. 8. As the concentration increases it is observed that the calcium chloride begins impeding the mucilage. The following microscope images were taken to study the visual aspects of this trend.

Example 3: Bacteria Flocculation Tests

*Bacillus cereus* (ATCC 10876), *Escherichia coli* and *Bacillus* anthracia were used as exemplary bacteria, as the both bacteria are potential contaminants in drinking water contamination. These bacteria also act as surrogates for other bacteria contaminants of similar size and characteristics, as flocculation is affected by interactions between the mucilage and bacteria surface. Since this is commonly the case with flocculants, the surface characteristics of gram-positive and gram-negative bacteria was studied and compared. In gram-positive bacteria, the outer layer of the cell wall consists of peptidoglycan, a combination of polysaccharides and amino acids, and contains teichoic acids, another kind of polysaccharide that links to lipids and maintain the attachment with the cell membrane (Archibald, A. R., The *Bacillus* Cell Envelope. In *Bacillus*, Harwood, C. R., Ed. Plenum Press, New York: New York City, 1989.) Gram-negative walls also have a layer of peptidoglycan, however, it is much thinner than those found in gram-positive walls and it is not directly exposed to the environment outside of the cell. Gram-negative bacteria have an additional bilayer that consists of phospholipids, channel proteins and an outer layer that consists of lipids attached to sugars, called lipopolysacharides or LPS. Lipid A, which is attached to the polysaccharide, is the cause of illness when gram-negative bacteria are killed while inside of the body. This extra layer in the cell wall also makes gram-negative bacteria more difficult to kill with antibiotic treatment, as it could potentially immobilize the movement of drug into the cell (Bauman, R. W., *Microbiology*. Pearson Education, Inc.: San Francisco, 2004; Ingraham, and Ingraham, *Introduction to Microbiology*. 2 ed., Brooks/Cole: Pacific Grove, C A, 2000; Lim, D., *Microbiology*. 2 ed.; WCB/McGraw-Hill: 1998).

In tests evaluating the removal of bacteria suspended in synthetic waters, it was observed that the mucilage alone did not display any significant settling. $CaCl_2$ did induce flocculation when tested alone and also when used in combination with both fractions of mucilage. Because of this, subsequent tests were treated with a combination of $CaCl_2$ and mucilage, and compared to a control column treated with only $CaCl_2$ and no additional flocculants.

Bacteria flocculation did not form a clear interface that can be recorded every minute. Instead the treated bacteria form small white flocs in the otherwise turbid water, which then fall to the bottom of the column as they are formed. Due to the difference, the mucilage evaluation discussed in this section was slightly different. Box plots are used to show the beginning (bottom of the box), duration (the space in between), and the completion (top of the box) of the floc formation and decent in the column. Dotted lines are used to represent the beginning (bottom dotted line) and the end (top dotted line) of the control column that contains no mucilage and only a specified amount of $CaCl_2$.

*Bacillus cereus* Removal with Cactus Mucilage.

Figure 9:
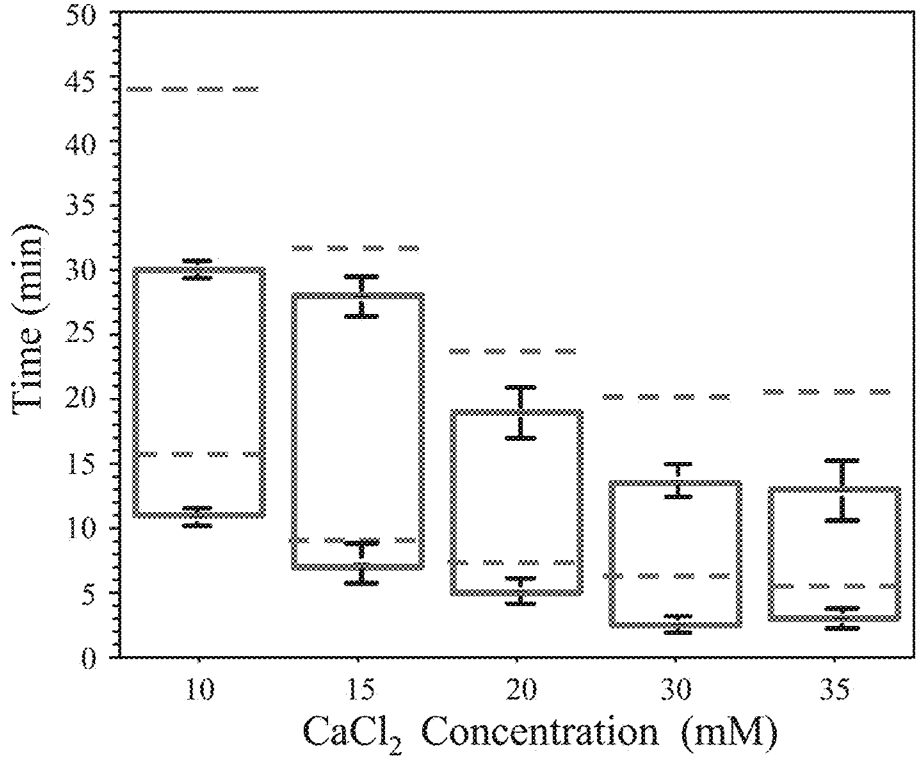
FIG. 9 is a graph showing the effects of $CaCl_2$ concentration on *Bacillus cereus* settling times in columns treated with and without the presence of NE. $CaCl_2$ concentrations ranging from 10-35 mM added to columns of *Bacillus cereus* with final concentrations of $10^8$ cells/mL suspended in Hard Water. Boxes indicate the flocculation start (bottom line) and end (top line) times of suspensions treated with the addition of a final NE concentration of 2 ppm. Dashed lines represent the start (bottom line) and end (top line) time of flocculation in columns containing no mucilage addition.

The changes in flocculation times with respect to the $CaCl_2$ concentration [10 to 35 mM] alone were evaluated, as seen in FIG. 9. These tests were performed in HW columns treated with a final concentration of 2 ppm NE. As the concentration of $CaCl_2$ increased, the settling rate of both the control and the experimental column also increased. On average all suspensions treated with mucilage both started and completed faster than the control columns with the same $CaCl_2$ concentrations. This indicates that although the $CaCl_2$ causes flocculation, when combined with mucilage the speed of the reaction increases because of the GE or NE addition. It was noted that only a small amount of mucilage is needed to increase the flocculation time by up to 10 minutes. Similar results were observed in columns of different water types, mucilage fractions, and concentrations (data not shown).

Figure 10A:
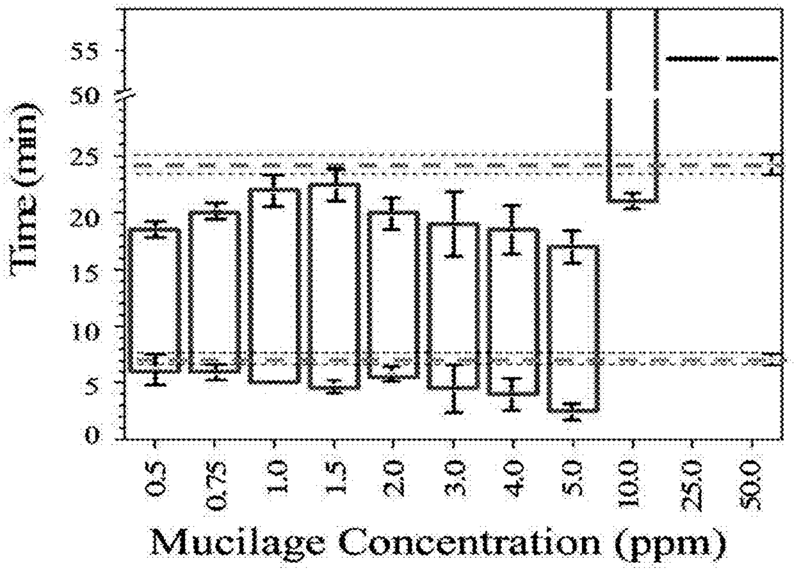
FIGS. 10(A) and (B) are box plots of *Bacillus cereus* settling rates with respect to the final mucilage concentration (ppm) in the column. Results observed in columns of $10^8$ cells/mL of *Bacillus cereus* suspended in Hard Water with final $CaCl_2$ concentrations of 20 mM. The boxes indicate the flocculation start (bottom line) and end (top line) time in columns treated with GE (A) and NE (B). Dashed lines indicate the flocculation start (bottom) and end (top) times of columns containing only 20 mM $CaCl_2$ and no additional mucilage treatment. Standard deviation displayed for the control (dotted) and mucilage treated columns were determined by comparing results from three different trials.
Figure 10B:
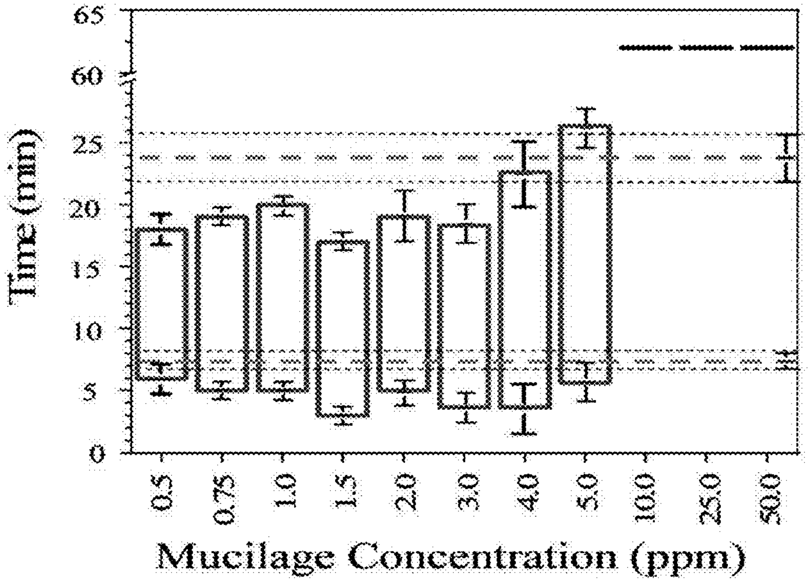

For each $CaCl_2$ concentration, a range of mucilage concentrations was tested to evaluate the effects of mucilage on the settling time. The settling rates of *B. cereus* with NE and GE concentrations ranging from 0.5-50 ppm were obtained from columns containing HW with a final $CaCl_2$ concentration of 20 mM, seen in FIGS. 10(A) and (B). NE concentrations of 0.5 to 3 ppm demonstrated flocculation that both started and finished faster than the control containing no mucilage, seen in FIG. 10(B). Between 3 and 4 ppm the settling time increased although, at a concentration of 4 ppm, the mucilage displayed a faster setting time than the control column. With a mucilage concentration of 5 ppm, the experimental column took longer than the control to complete its settling even though the flocs began to form slightly faster. At NE concentrations of 10, 25 and 50 ppm, signs of flocculation occurred after the control column had finished settling, if at all. This indicates that there is an optimal concentration at which the mucilage no longer produced flocs faster than the control columns; in this case, concentrations above 4 ppm. By comparing these results to the settling time of GE, seen in FIG. 10(A), the slight differences in the potential of the mucilage were observed. Contrary to the observations described above concerning *B. cereus* treated with NE, suspensions treated with 5 ppm GE caused flocculation that started and completed well within the time that the control had completed. In addition, at a GE concentration of 10 ppm flocculation started before the control had completely settled, whereas the NE columns at this concentration were not observed to form flocs in this time range. Like the columns treated with NE, GE concentrations of 25 and 50 ppm showed no signs of flocculation even long after the control column had completed.

Figure 11:
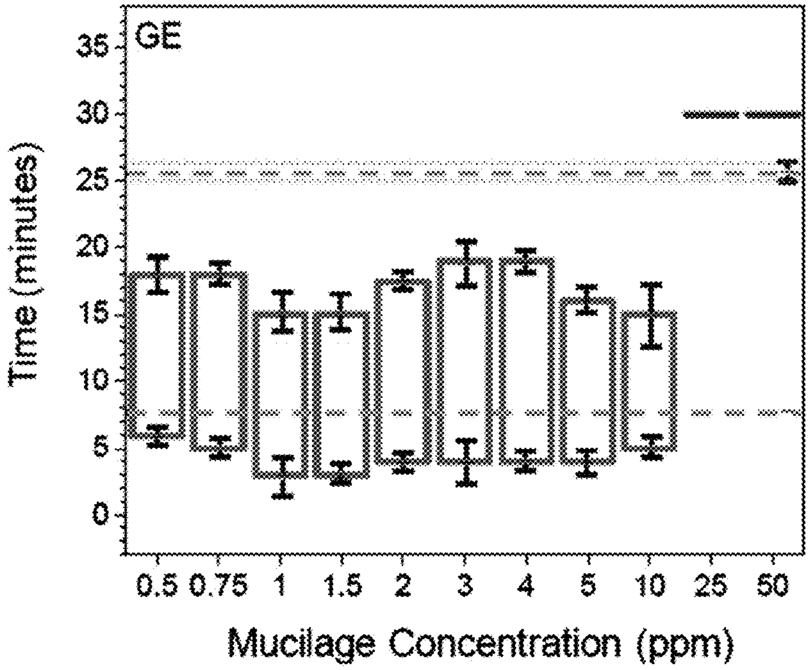
FIG. 11 is a graph showing *B. cereus* settling times in SW with GE. Soft water columns treated with GE display similar results to hard water columns treated under the same conditions. Here, in the presence of 50 mM $CaCl_2$, GE concentrations of 0.5 to 10 ppm exhibit flocculation more rapidly then the control containing only $CaCl_2$. Concentrations of 25 and 50 display no flocculation in the time frame of the experiment.
Figure 12A:
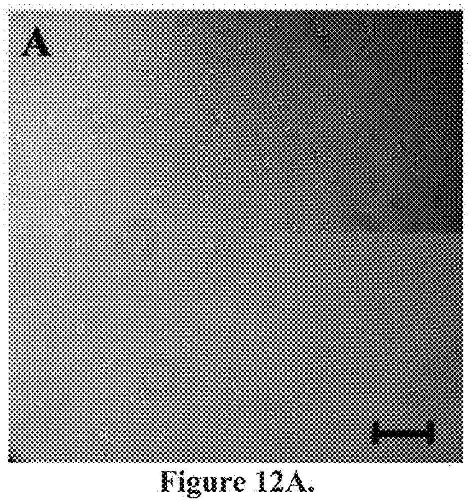
FIGS. 12(A) through (G) are digital images taken from a light microscope of samples extracted from *Bacillus cereus* suspensions of $1\times10^8$ cells/mL in Hard Water with (A) no treatment; (B) with 20 mM $CaCl_2$; (D) with 20 mM $CaCl_2$ and 2 ppm GE; and (F) with 20 mM $CaCl_2$ and 2 ppm NE. Images also shown of samples taken from *Bacillus cereus* suspensions in Soft Water treated (C) with 40 mM $CaCl_2$, (E) with 40 mM $CaCl_2$ and 2 ppm GE; and (G) with 40 mM $CaCl_2$ NE. Scale bars indicative of 10 nm.
Figure 12B:
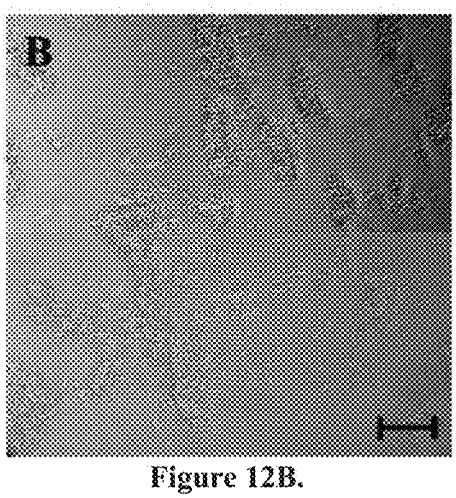
Figure 12C:
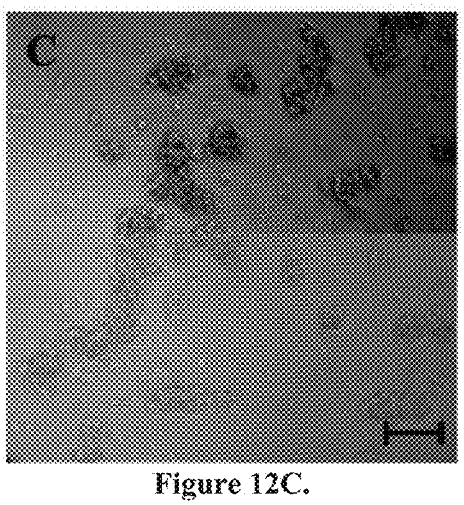
Figure 12D:
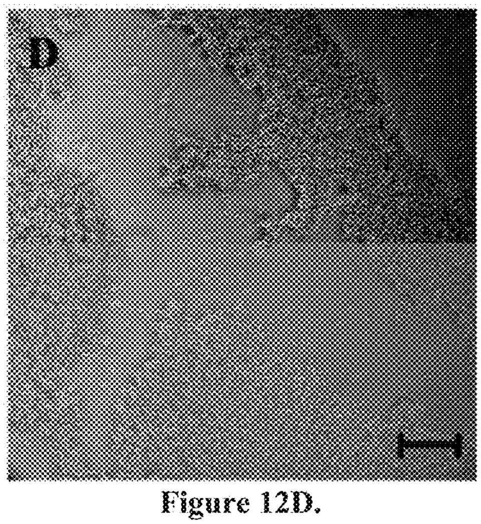
Figure 12E:
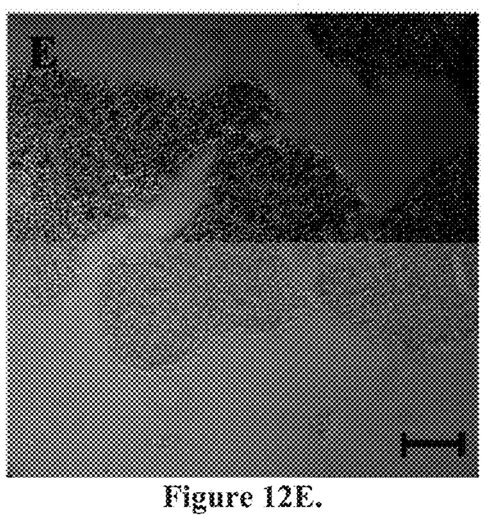
Figure 12F:
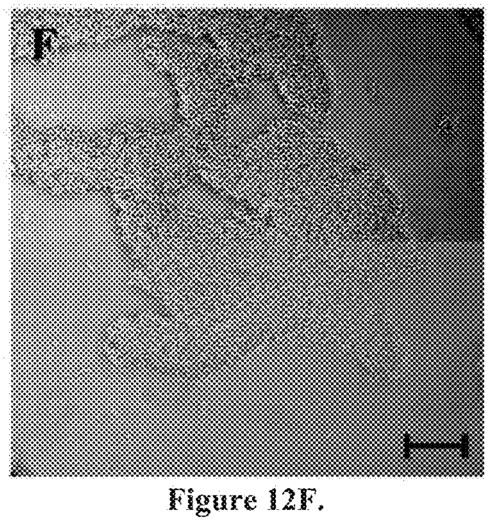
Figure 12G:
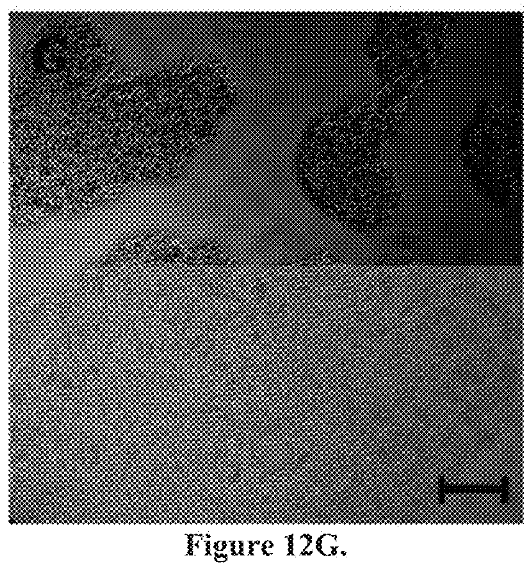

An important difference between the mucilage's ability to aggregate kaolin particles compared to bacteria was that there existed a concentration where the bacteria no longer reacted to the mucilage in a positive manner. In columns containing kaolin, increases in mucilage concentration resulted in higher settling rates, but no concentrations were observed to restrict settling as seen in suspensions of *B. cereus*. Also, in columns containing kaolin, the NE appeared to cause larger increases in settling rates while the GE seems to work slightly better as a treatment for *B. cereus* suspensions. This is most likely attributed to the structural differences of the mucilage types discussed earlier. Experiments concerning the removal of *B. cereus* suspended in SW have been observed to required higher concentrations of $CaCl_2$ to achieve flocculation rates similar to those observed in HW most likely due to the ion differences in the waters (data not shown). This observation implies that in order for the GE to be as effective as possible, additional ions may need to be added to the water with the mucilage. Because of this difference, HW columns were treated with 20 mM $CaCl_2$ while SW columns contained a final concentration of 50 mM, as seen in FIG. 11.

Comparisons of *B. cereus* flocculation characteristics were performed in the presence of $CaCl_2$ alone and in conjunction with mucilage, seen in FIGS. 12(A) through (G). Control images from bacteria suspended in HW alone indicated that without treatment, aggregation did not occur and the bacteria were freely floating in the solution, seen in FIG. 12(A). Comparisons of flocs obtained from HW (with final $CaCl_2$ concentrations of 20 mM) and SW columns (with final $CaCl_2$ concentrations of 40 mM) alone were performed, seen in FIGS. 12(B) and (C). The addition of GE (2 ppm), seen in FIGS. 12(D) for HW and 12(E) for SW, or NE (2 ppm), seen in FIGS. 12(F) for HW and 12(G) for SW, to suspensions containing the above $CaCl_2$ concentrations resulted in the flocs. From these images it was observed that, although both concentrations of $CaCl_2$ did cause flocculation in column tests, the flocs formed do not appear as organized, stable or large as those formed in the presence of mucilage. The size difference observed here is most likely responsible for the increased settling rate in the columns containing mucilage, as the density will naturally cause higher settling rates.

Bacteria removal rates associated with NE and GE at various concentrations (0, 2, 3, 4, and 5 ppm) in SW with 40 mM $CaCl_2$ were high, seen in Table 8. All removal rates are in the range of 95-99% and most are above 98%. The control columns containing no mucilage and only $CaCl_2$ produced similar high removal rates. Similar removal efficiency has also been observed in columns of HW. Although these removal rates are high, the level of bacteria remaining in the columns renders the water still unsafe to drink. This is due to the initial cell concentration ($10^8$ cell/ml) used to obtain a visual indicator of flocculation and removal, which would not be typically observed in the real world. Future experimentation will involve optimizing parameters for bacterial removal at lower levels of contamination without a visual indicator.

TABLE 8

Removal percentages of *Bacillus cereus* concentrations of $10^8$ cells/mL suspended in Soft Water with a final $CaCl_2$ concentration of 40 mM treated with GE and NE concentrations ranging from 0-5 ppm.

| | Mucilage Concentration (ppm) | | | | |
|---|---|---|---|---|---|
| Mucilage Type | 0 | 2 | 3 | 4 | 5 |
| GE | 98.21 | 98.50 | 98.06 | 98.59 | 95.69 |
| NE | 98.21 | 98.11 | 98.07 | 98.59 | 98.51 |

The results discussed in this paper demonstrate the potential of mucilage extracted from the *Opuntia ficus-indica* as a flocculation agent for sediment and bacterial contamination in ion rich waters. The cactus' prevalence, affordability and current cultural use make it an attractive natural material for a water purification technology that could be of benefit locally in Mexico and around the world. As demonstrated in the results provided here, the different mucilage fractions provide diversity both in their structural features as well as in their reaction to the natural ion concentration in the water they are treating.

*Escherichia coli* Removal with Cactus Mucilage.

Figure 13:
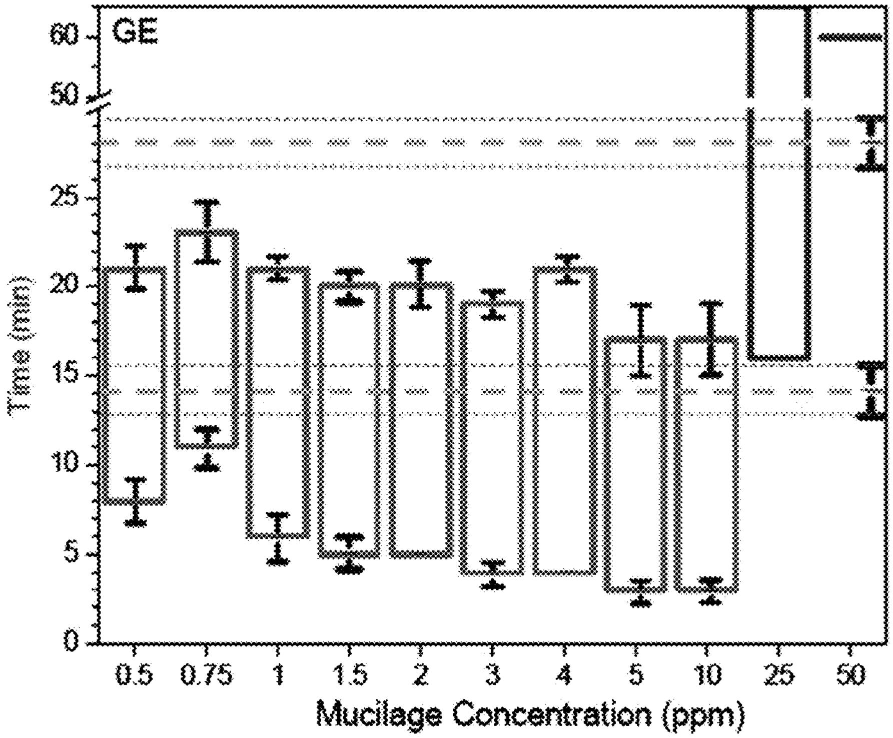
FIG. 13 is a graph showing *E. coli* flocculation in HW at a range of GE concentrations. In columns containing $10^8$ cells/mL, *E. coli* flocculation with the addition of mucilage was observed to be more efficient with the addition of 0.5 to 10 ppm GE. The control required twice as much time after column inoculation to show signs of settling when compared to the same test with *B. cereus*.

In the testing of mucilage for *E. coli* removal in HW, 20 mM $CaCl_2$) and GE were used due to their capabilities observed in *B. cereus* tests. FIG. 13 shows that for final GE concentrations of 0.5 to 10 ppm, the columns treated with mucilage begin and end much faster than the control. From this plot differences between *B. cereus* and *E. coli* can be observed. In columns of *B. cereus* in HW the control column flocculation was observed to begin in 7.5 minutes. Conversely, in columns containing *E. coli*, flocculation does not begin in the control column until 14 minutes after column inoculation. *B. cereus* columns were also seen to complete settling 24 minutes into the experiment while *E. coli* columns took slightly longer.

Both *B. cereus* and *E. coli* exhibit differences to the kaolin studies performed with the same mucilage. In kaolin columns the higher mucilage concentrations worked better and an optimal concentration as reached where settling no longer increased. In columns of bacteria treated with mucilage the opposite effect is observed. The lower concentrations work better and at higher concentrations, no reaction is seen in the columns. This is potentially due to a number of things including the size and surface characteristic differences between the contaminant types. In kaolin suspensions, the ion concentration was observed to affect the settling rate; however, the mucilage did not rely on the presence of ions for the flocculation to occur with kaolin as it does with bacteria.

HW containing *E. coli* suspended were treated with 20 mM $CaCl_2$) and GE concentrations of 0 ppm, 10 ppm, 25 ppm, 50 ppm, and 2 ppm. Columns treated with 10 ppm and 2 ppm of GE quickly began to form flocs, and the water around the flocs appeared relatively clear when compared to columns treated with 0 ppm, 25 ppm, and 50 ppm of GE. While a solution containing *E. coli* treated with 20 mM $CaCl_2$) will flocculate, the flocs are not very large and do not contain a lot of bacteria. Conversely, samples treated with 2 ppm GE in the presence of 20 mM $CaCl_2$, generate a large cluster of bacteria. Here, the size and high bacteria content of the flocs formed using mucilage can be readily observed by microscope. The flocculation observed in bacteria columns is similar to that seen in suspensions of kaolin treated with mucilage. The gathering of particles observed in both cases causes the density of the contaminating material to change, as it is becoming larger, and gravity induced settling occurs.

*Bacillus anthracis* Removal with Cactus Mucilage.

Figure 14A:
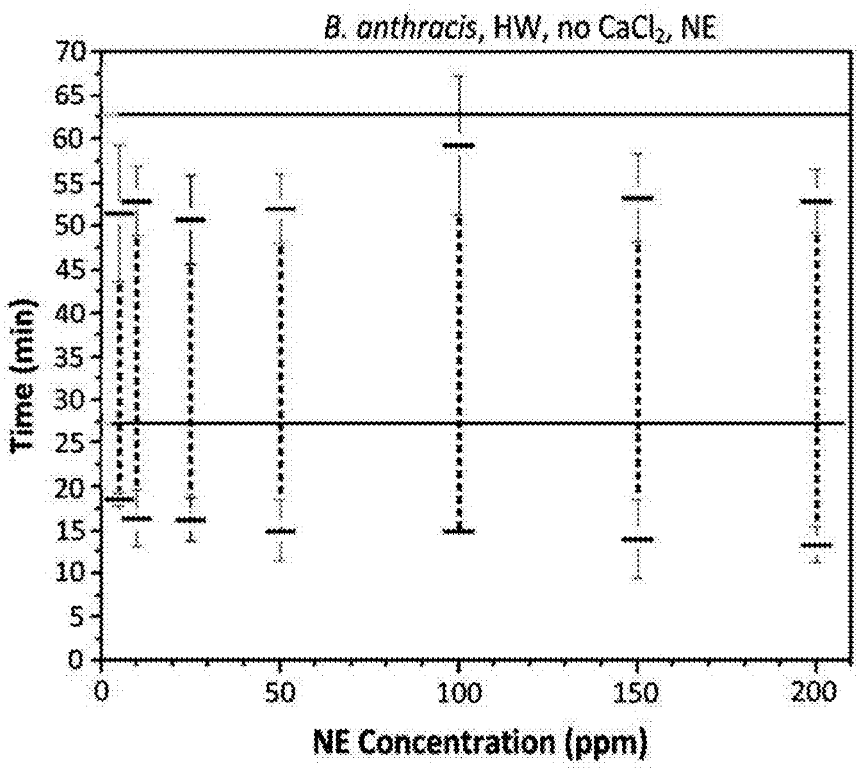
FIGS. 14(A) and (B) are graphs showing the effects of different mucilage extract concentrations ranging from 0-200 ppm on the settling rate of *B. anthracis* in HW synthetic water using different concentrations of (A) NE; and (B) GE.
Figure 14B:
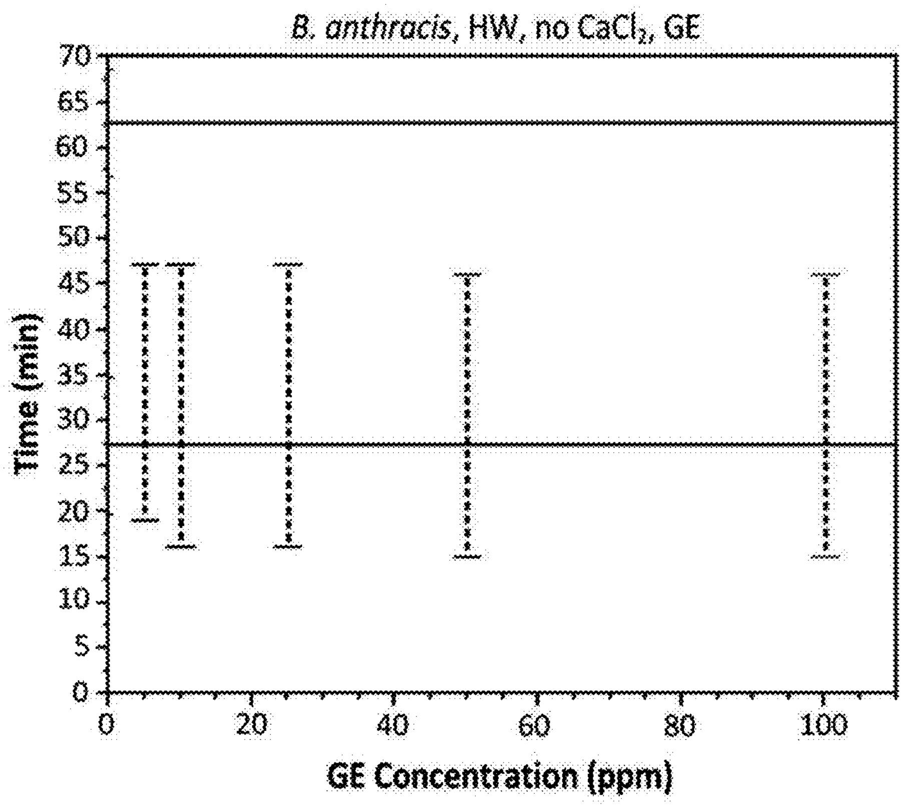

Flocculation tests of *Bacillus anthracis* were performed in HW columns treated with NE or GE without the presence of calcium chloride. Both NE and GE mucilage extracts efficiently aggregated *B. anthracis*, as seen in FIGS. 14(A) for NE and 14(B) for GE. For each extract type, NE and GE, a range of mucilage concentrations were tested to evaluate the effects of mucilage on the settling time. The settling rates of *B. anthracis* with NE and GE concentrations ranging from 5-200 ppm were obtained from columns containing HW. The bottom data points represent the flocculation start time and the top data points the time at which flocs were no longer falling in the column of the specified concentration. The solid lines represent the beginning (bottom) and end (top) of flocculation in the control column containing no mucilage.

While different fractions of mucilage are more efficient with different contamination species, likely due to the structural differences between the two mucilage compounds, both the Gelling (GE) and Non-Gelling (NE) mucilage extracts obtained from the *O. ficus-indica* cactus are capable of removing sediment and bacteria. Structurally, the GE exhibits a fiber like structure that is orderly and directional while the NE has a denser net like structure.

In water prepared at high ion-concentrations, referred to as HW, settling rates of kaolin increased with increasing concentrations of both NE and GE at a faster rate than SW, surrogate water with lower ion-concentration, which in turn settled faster than kaolin suspended in DI water. The concentration of both NE and GE gradually reach a point where the settling rate begins to level off and the change in rate versus concentration is no longer significant.

Gram-positive *B. cereus* demonstrated flocculation similar to kaolin when exposed to GE and NE coupled with $CaCl_2$. Bacteria flocculation, unlike kaolin was not observed to form a clean interface, rather the flocculation beginning and end time were recorded and evaluated compared to a control. The mucilage extracts were more effective at flocculating bacteria at lower concentrations, which is opposite to what was observed in kaolin columns. For NE, concentrations of 0.5 to 4 ppm produced flocs that both developed and settled faster than the control column that contained only $CaCl_2$. At concentrations of 5 ppm the flocs took a greater amount of time to settle then those formed in the control column. At concentrations of 10, 25 and 50 ppm, signs of flocculation did not even appear in the time scope of the experiment. Columns treated with GE worked at slightly higher concentrations than the columns treated with NE and were not slower than the control until concentrations of 10 ppm. Concentrations of 25 and 50 ppm showed no signs of removal. In addition, the flocculation time frame was shown to decrease as $CaCl_2$ concentration increased over 10-35 mM, as well as columns ran with the addition of 2 ppm NE to these $CaCl_2$ concentrations. The differences in the outer portion of the bacteria cell walls are also likely responsible for differences in the ability of mucilage to remove the bacteria.

In images of *B. cereus* in HW (20 mM $CaCl_2$) and SW (50 mM $CaCl_2$) treated with 2 ppm NE or GE, flocs were observed to be both larger and seemingly more stable due to the tightness of the bacteria packing. From these treated columns removal rates of 95-99 percent were observed. Settling results for gram-negative *E. coli* proved to be similar to those for *B. cereus* using HW, $CaCl_2$ concentrations of 20 mM and GE concentrations ranging from 0.5-10 ppm. Control columns were observed to require twice as long to begin settling after inoculation and mucilage columns did not appear to require more time. When observed under microscope large flocs were observed in columns treated with 2 ppm GE and 20 mM $CaCl_2$ when compared to those treated with only 20 mM $CaCl_2$ and a column that was untreated.

Figure 15:
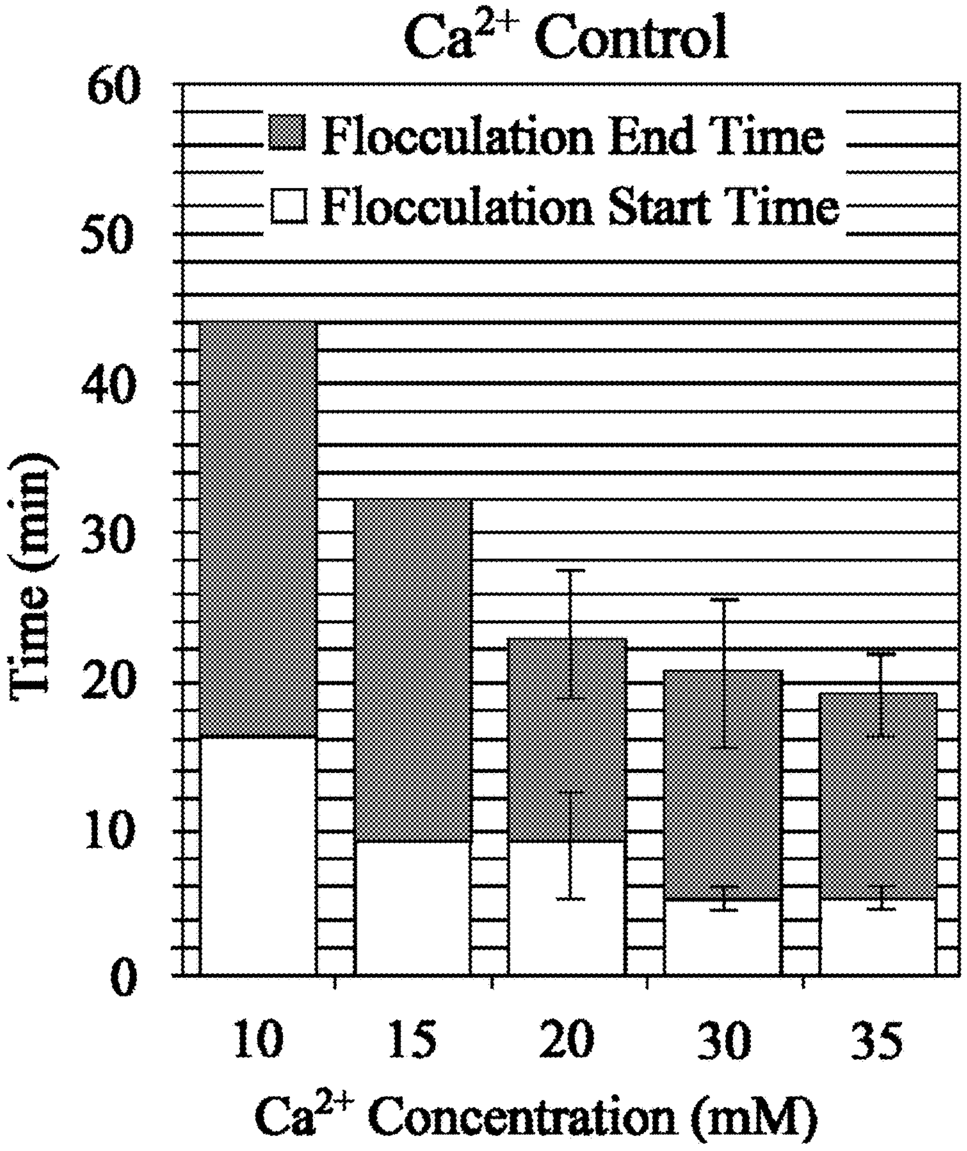
FIG. 15 is a graph showing *B. cereus* flocculation start and end times for different calcium concentrations. *B. cereus* were originally seeded at $1\times10^8$ cells/mL.
Figure 16:
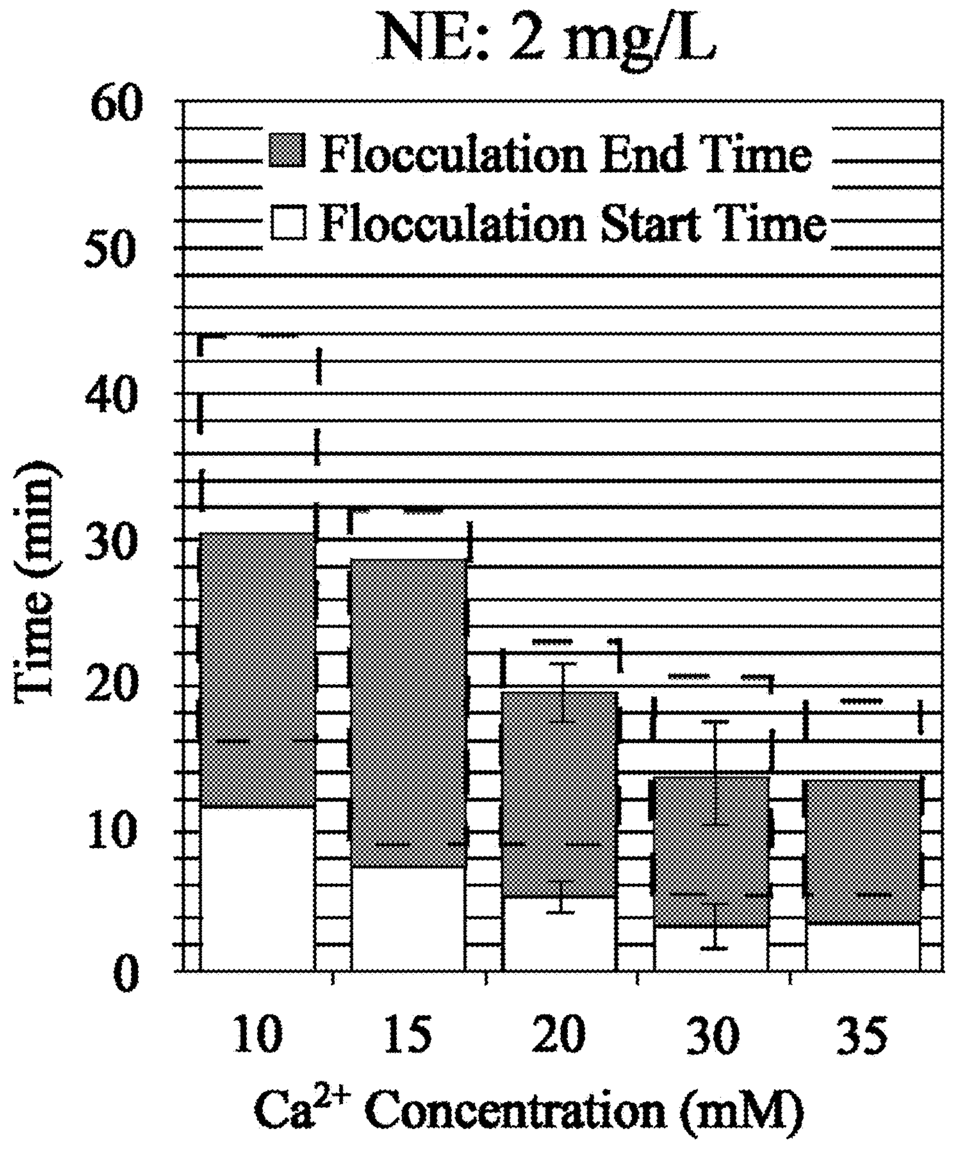
FIG. 16 is a graph showing *B. cereus* flocculation start and end times for 2 mg/L NE extract using different calcium concentrations. *B. cereus* were originally seeded at $1\times10^8$ cells/mL.
Figure 17:
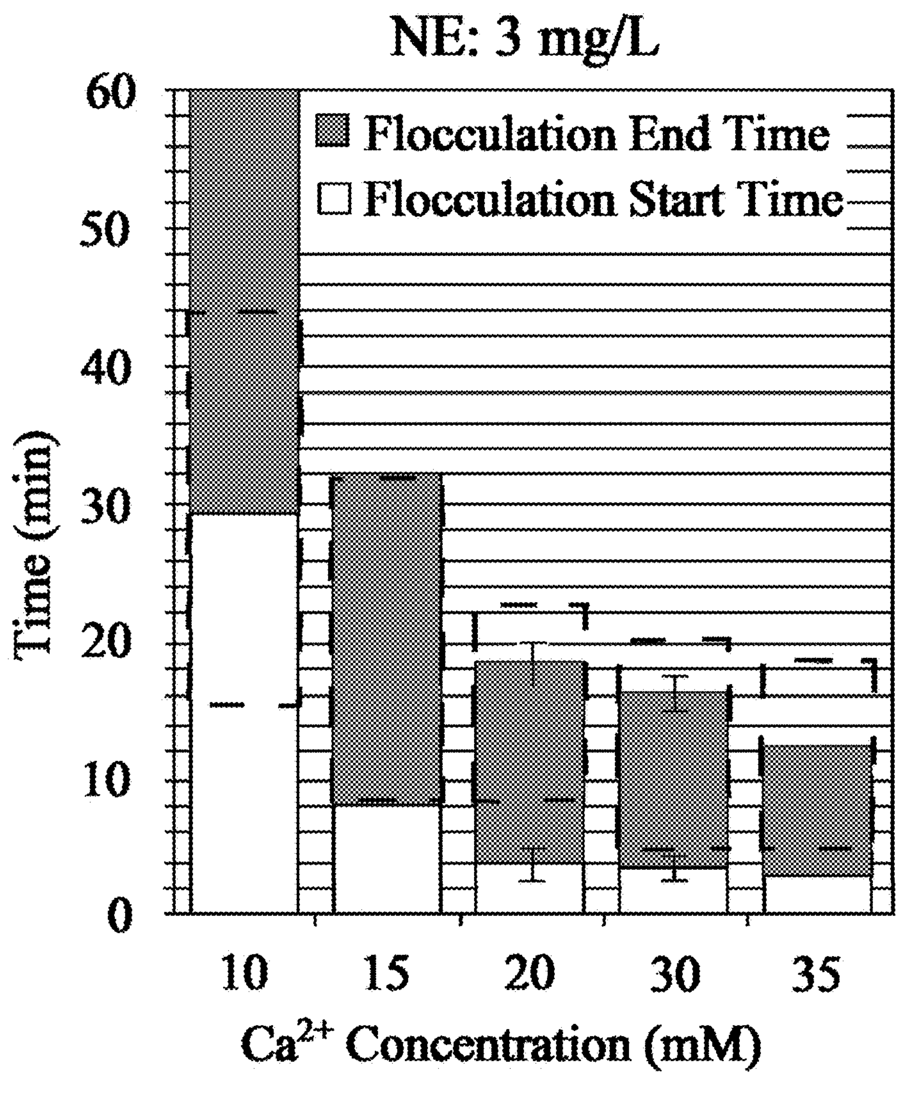
FIG. 17 is a graph showing *B. cereus* flocculation start and end times for 3 mg/L NE extract using different calcium concentrations. *B. cereus* were originally seeded at $1\times10^8$ cells/mL.
Figure 18:
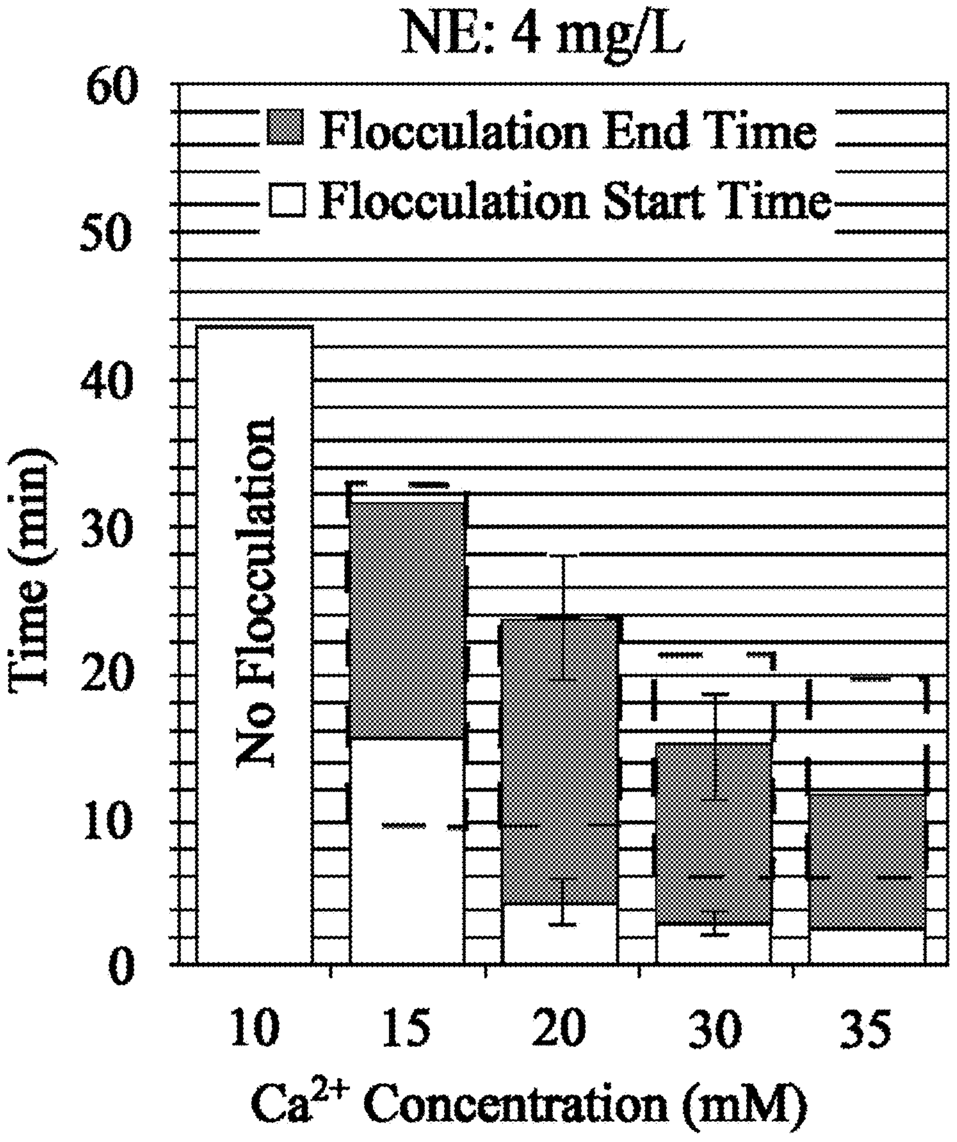
FIG. 18 is a graph showing *B. cereus* flocculation start and end times for 4 mg/L NE extract using different calcium concentrations. *B. cereus* were originally seeded at $1\times10^8$ cells/mL.
Figure 19:
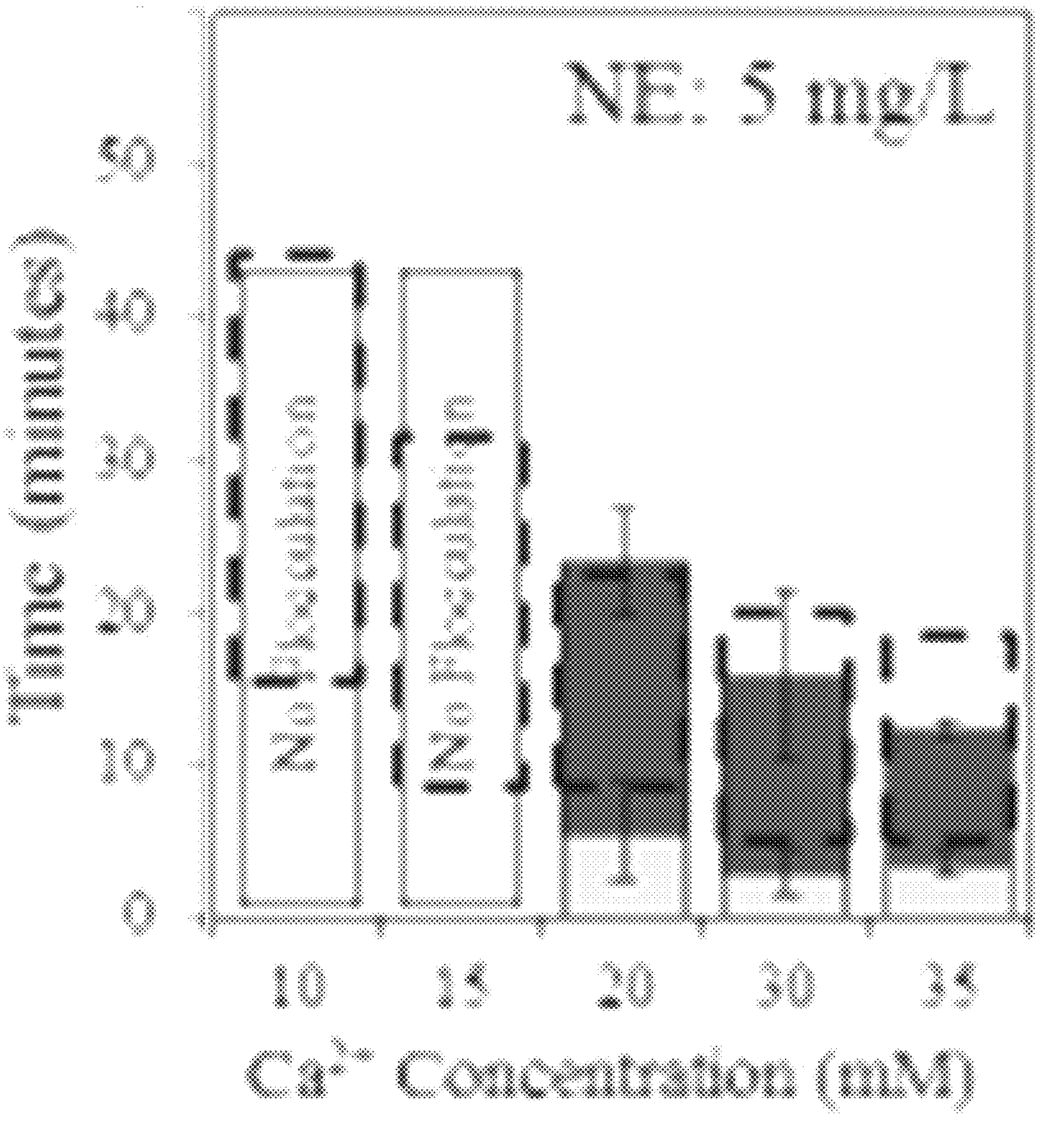
FIG. 19 is a graph showing *B. cereus* flocculation start and end times for 5 mg/L NE extract using different calcium concentrations. *B. cereus* were originally seeded at $1\times10^8$ cells/mL.

Testing of flocculation methods on *B. cereus* at $1\times10^8$ cells/mL showed calcium was able to flocculate high concentrations of bacteria in a dose-dependent manner, as seen in FIG. 15. Nongelling extract increased flocculation considerably within a narrow dosage range, with 2 mg/L NE extract increasing flocculation in all calcium concentrations, seen in FIG. 16. As NE extract concentrations increased, lower levels of calcium concentrations either had large flocculation times, as seen in FIG. 17, or did not flocculate, as seen in FIGS. 18 and 19.

Example 4: *E. coli* Flocculation at Natural Concentration

Hard water was prepared, as described in the Materials and Methods section, and *Escherichia coli* added to a concentration of $1\times10^3$ cells/mL or at varying concentrations from 10 cells per mL to 100,000,000 ($1\times10^8$) cells/mL. The concentrations were determined based on naturally-occurring bacterial levels for lower concentrations and going up to concentrations not seen in nature. For example, U.S. Geological Survey of The Chattahoochee River in Georgia have shown *E. coli* levels that have varied from 28 colonies per 100 mL water to 1860 colonies per 100 mL water from October 2014 to October 2015 (U.S. Geological Survey). Additionally, ranges for common water-borne pathogens are depicted in Table 9. The U.S. Department of the Interior have determined levels over 235 colonies per 100 mL for one-time tests and 126 colonies per 100 mL for average levels over a 30 day period are unsafe and can result in illness (Crighton, et al., Eds. Citizens Monitoring Bacteria: A training manual for monitoring *E. coli.* 2d Ed. 2007). Infective levels of *E. coli* are as low as 1-100 particles for enterohemorrhagic variants and around 10000 for enteropathogenic, enterotoxic, and enteroinvasive variants (Guidelies for drinking-water quality. 3d Ed. World Health Organization, Geneva CH, 2008).

TABLE 9

Concentrations (per liter) of pathogens in source waters.

| Pathogenic bacteria | Lakes and reservoirs | Impacted Rivers and streams | Wilderness rivers and streams | ground-water |
|---|---|---|---|---|
| *Campylobacter* | 20-500 | 90-2500 | 02-1100 | 0-10 |
| Salmonella | N/A | 3-5.8 × $10^4$ | 1-4 | N/A |
| *E. coli* | 1 × $10^4$-1 × $10^6$ | 3 × $10^{4-6}$ 1 × 10 | 6 × $10^3$-3 × $10^4$ | 0-1 × $10^3$ |
| *Cryptosporidium* | 4-290 | 2-480 | 2-240 | 0-1 |
| *Giardia* | 2-30 | 1-470 | 1-2 | 0-1 |

Figure 20:
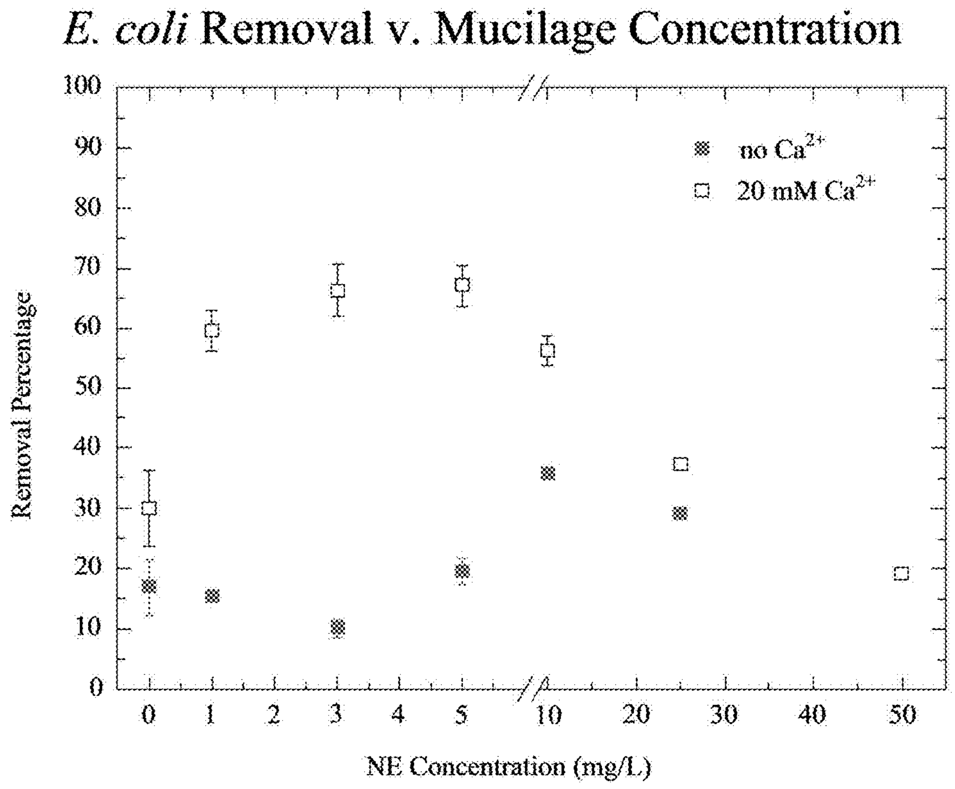
FIG. 20 is a graph showing *E. coli* removal from hard water at various concentrations of nongelling mucilage extract (NE) with or without calcium ions added. *E. coli* was seeded at $1\times10^3$ cells/mL. All experiments were conducted in replicates of at least three and statistical data was determined using Origin Pro 8 (Northampton, Mass.). One way analysis of variance (ANOVA) and Tukey test of means comparisons ($\alpha$=0.05), performed using OriginPro 8.
Figure 21:
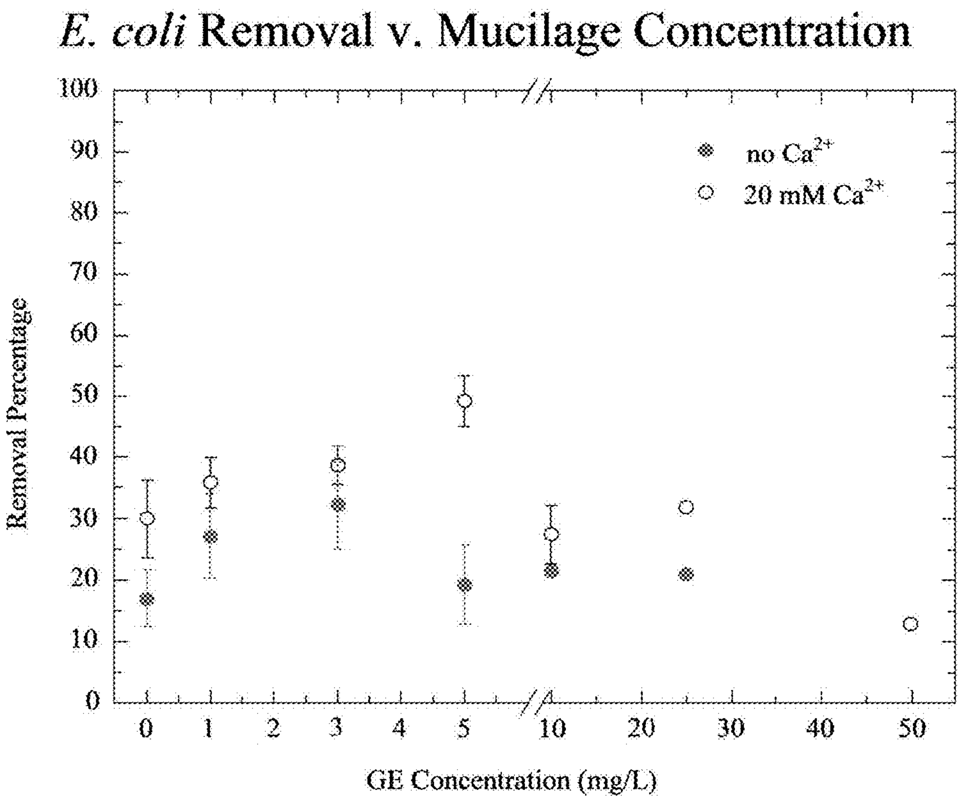
FIG. 21 is a graph showing *E. coli* removal from hard water at various concentrations of gelling mucilage extract (GE) with or without calcium ions added. *E. coli* was seeded at $1\times10^3$ cells/mL. All experiments were conducted in replicates of at least three and statistical data was determined using Origin Pro 8 (Northampton, Mass.). One way analysis of variance (ANOVA) and Tukey test of means comparisons ($\alpha$=0.05), performed using OriginPro 8.

As seen in FIG. 20, the use of nongelling extract resulted in minimal bacterial removal, of around 20%, which is commensurate with bacterial flocculation without any additives included in the water, as seen in Table 10. However, inclusion of calcium ions, in the form of a calcium salt, drastically increased bacterial removal to around 55%-70% in the operational concentration of the mucilage extract of 1 mg/L to 10 mg/L, shown in FIG. 20. Concentrations above or below this operational range resulted in poor bacterial removal, which was slightly above the mucilage-only treated bacterial-laden water samples. When gelling extract was added to waters spiked with bacterial, bacteria removal was much more modest, with a maximal removal of around 50% for 5 mg/L gelling extract, as seen in FIG. 21.

TABLE 10

A summary of the maximal percentage of *E. coli* removed from hard water based on treatment. *E. coli* were seeded at 1 × $10^3$ cells/mL.

| | control[a] | NE mucilage | GE mucilage |
|---|---|---|---|
| 0 mM $Ca^{2+}$ | 17% | 36% | 32% |
| 20 mM $Ca^{2+}$ | 30% | 67% | 49% |

[a]Control samples were tested at 1 × $10^3$ cells/mL without mucilage.

Figure 22:
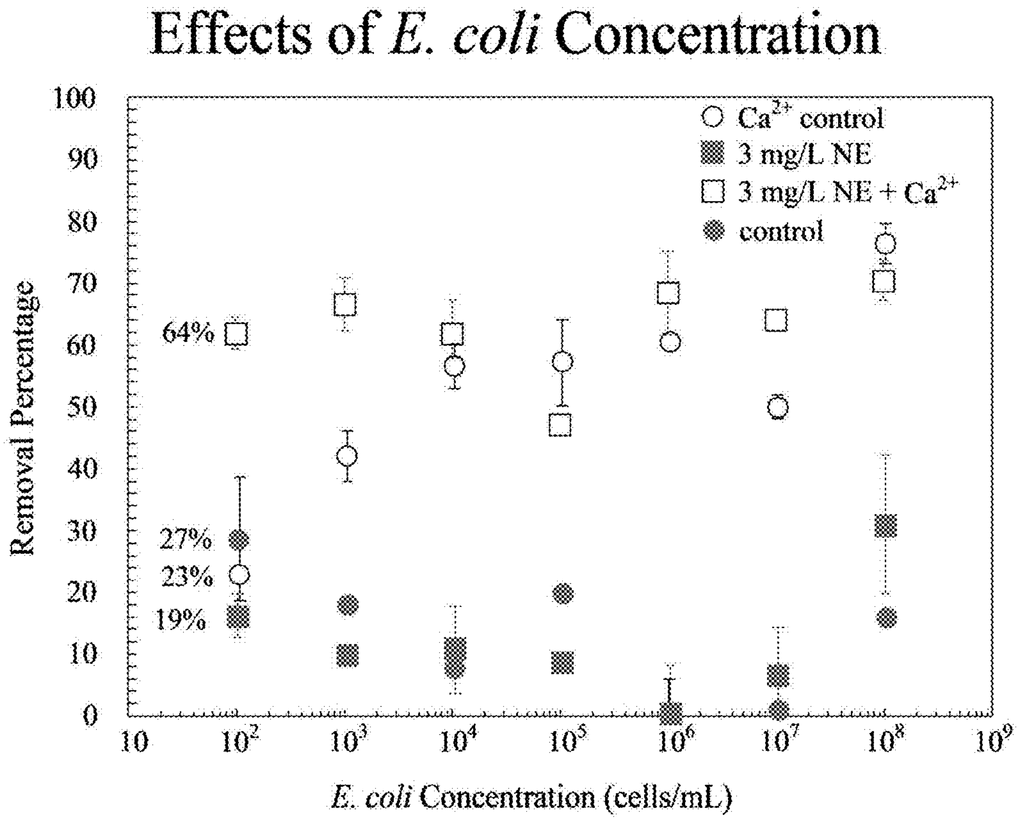
FIG. 22 is a graph showing the effects of *E. coli* concentration on the ability of nongelling mucilage extract (NE) to remove *E. coli* from hard water. All experiments were conducted in replicates of at least three and statistical data was determined using Origin Pro 8 (Northampton, Mass.). One way analysis of variance (ANOVA) and Tukey test of means comparisons ($\alpha$=0.05), performed using OriginPro 8.

Hard waters were spiked with *E. coli* at 10 mg/mL through $1\times10^8$ mg/mL, as seen in FIG. 22, and concentration-dependent effects on bacteria flocculation were analyzed. Controls without treatment (control) and mucilage only showed low levels of flocculation of around 30% or less. As bacterial concentrations increased, calcium flocculation became more effective, to about the same level as mucilage and calcium treatments by $1\times10^4$ cell/mL of *E. coli*. However, at lower bacterial concentrations, calcium showed little or no difference compared to the control sample. By comparison, at lower bacterial concentrations, treatment of *E. coli* with mucilage and calcium resulted in considerably higher flocculation levels compared to all other treatments, as seen in FIG. 22. Of note, at bacterial levels commonly seen in nature, i.e. below $1\times10^4$ cells/mL or $1\times10^7$ cells/L, seen Table 9, the mucilage and calcium treatment was far superior to any of the other treatments.

In the preceding specification, all documents, acts, or information disclosed do not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a composition and method for treatment of water, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of removing a bacterial contaminant from water, comprising the steps of:

providing a sample of water containing a bacterial contaminant wherein the bacterial contaminant is *Escherichia coli;* adding a predetermined amount of salt to the water, wherein the salt is calcium chloride wherein the calcium chloride is added at a final concentration of 20 mM;

adding an isolate of cactus mucilage to the water, wherein the cactus mucilage is a non-gelling extract isolated from a cactus;

wherein the non-gelling extract is isolated comprising the steps of:

liquefying cactus plant pads to form a suspension;

neutralizing the pH of the suspension;

centrifuging the suspension to separate solids from a liquid supernatant;

collecting the liquid supernatant;

mixing the liquid supernatant with a sodium chloride solution to form a pulp;

adding acetone to the pulp at a ratio of acetone to pulp of 1:2 to form a precipitate;

washing the precipitate with isopropanol at a ratio of 1:1;

wherein the nongelling extract is added at 1 ppm to 5 ppm;

allowing the bacterial contaminant in the water to settle; and removing between 55% to 70% of the bacterial contaminant from the water.

2. The method of claim 1, wherein the plant is *Opuntia ficus indica.*

3. The method of claim 1, wherein the nongelling extract is added to the water at 3 ppm.

4. The method of claim 1, further comprising removing the water from the upper surface of the water sample, thereby removing the contaminant from the water.

* * * * *